(12) United States Patent
Mateosky et al.

(10) Patent No.: US 9,374,166 B2
(45) Date of Patent: Jun. 21, 2016

(54) HIGH SPEED OPTICAL COMMUNICATION SYSTEMS AND METHODS WITH FLEXIBLE BANDWIDTH ADAPTATION

(75) Inventors: John P. Mateosky, West River, MD (US); Michael Y. Frankel, Baltimore, MD (US); Kevin S. Meagher, Bowie, MD (US)

(73) Assignee: Ciena Corporation, Hanover, MD (US)

( * ) Notice: Subject to any disclaimer, the term of this patent is extended or adjusted under 35 U.S.C. 154(b) by 238 days.

(21) Appl. No.: 13/372,013

(22) Filed: Feb. 13, 2012

(65) Prior Publication Data

US 2013/0209091 A1    Aug. 15, 2013

(51) Int. Cl.
| | |
|---|---|
| *H04B 10/40* | (2013.01) |
| *H04B 10/03* | (2013.01) |
| *H04B 10/07* | (2013.01) |
| *H04B 10/516* | (2013.01) |
| *H04B 10/079* | (2013.01) |
| *H04B 10/60* | (2013.01) |

(52) U.S. Cl.
CPC ........ *H04B 10/516* (2013.01); *H04B 10/07953* (2013.01); *H04B 10/60* (2013.01)

(58) Field of Classification Search
CPC .. H04B 10/50; H04B 10/505; H04B 10/5051; H04B 10/5053; H04B 10/516; H04B 10/5161; H04B 17/00; H04B 10/07953; H04B 10/60; H04L 27/2697; H04L 27/2601; H04L 1/00; H04L 1/0001; H04L 1/0002; H04L 1/00003; H04L 1/0006
USPC ...................... 398/135–139, 195, 1–8, 25–38
See application file for complete search history.

(56) References Cited

U.S. PATENT DOCUMENTS

| | | | | |
|---|---|---|---|---|
| 5,363,408 A | * | 11/1994 | Paik et al. | 375/261 |
| 5,541,955 A | * | 7/1996 | Jacobsmeyer | 375/222 |
| 5,764,699 A | * | 6/1998 | Needham et al. | 375/261 |
| 5,909,469 A | * | 6/1999 | Frodigh et al. | 375/302 |
| 5,946,104 A | * | 8/1999 | Yoshida | 358/412 |
| 6,400,928 B1 | * | 6/2002 | Khullar | H04L 1/0003 375/237 |
| 6,496,297 B1 | | 12/2002 | Frankel et al. | |
| 6,769,086 B2 | * | 7/2004 | Western | H04L 1/0009 370/329 |
| 6,829,251 B2 | * | 12/2004 | Duvaut et al. | 370/468 |

(Continued)

OTHER PUBLICATIONS

Moosavi et al, A Fast Scheme for Blind Identification of Channel Codes, Dec. 2011, IEEE, pp. 1-5.*

(Continued)

*Primary Examiner* — Ken N Vanderpuye
*Assistant Examiner* — Dibson Sanchez
(74) *Attorney, Agent, or Firm* — Clements Bernard PLLC; Christopher L. Bernard; Lawrence A. Baratta, Jr.

(57) ABSTRACT

A fiber optic system includes a transmitter configured to utilize a plurality of modulation formats and a receiver communicatively coupled to the transmitter and configured to utilize a plurality of modulation formats. The transmitter and the receiver are cooperatively configured to set a modulation format of the plurality of modulation formats based upon optical signal-to-noise ratio associated therewith. A flexible bandwidth adaptation method includes monitoring at least one aspect of an optical link at a network element, responsive to the at least one aspect, computing a new modulation scheme for the optical link, and, if a solution is found for the new modulation scheme, changing to the new modulation format.

20 Claims, 14 Drawing Sheets

(56) References Cited

U.S. PATENT DOCUMENTS

| | | | |
|---|---|---|---|
| 6,904,082 B2* | 6/2005 | Jones | 375/220 |
| 6,985,726 B2* | 1/2006 | Ahmed | H04L 1/0046 455/432.2 |
| 7,016,296 B2* | 3/2006 | Hartman, Jr. | 370/204 |
| 7,020,073 B2* | 3/2006 | Kadous et al. | 370/208 |
| 7,099,597 B2* | 8/2006 | Saunders et al. | 398/193 |
| 7,308,052 B2* | 12/2007 | Cheng et al. | 375/340 |
| 7,313,204 B2* | 12/2007 | Yang | H04L 27/0008 375/322 |
| 7,391,728 B2* | 6/2008 | Natarajan et al. | 370/235 |
| 7,415,208 B1 | 8/2008 | Haggans et al. | |
| 7,474,903 B2* | 1/2009 | Kim et al. | 455/550.1 |
| 7,542,514 B2* | 6/2009 | Song et al. | 375/260 |
| 7,574,134 B2 | 8/2009 | Frankel | |
| 7,602,814 B2 | 10/2009 | Meagher et al. | |
| 7,609,757 B2* | 10/2009 | Jones | 375/220 |
| 7,634,194 B2 | 12/2009 | Frankel et al. | |
| 7,676,002 B2* | 3/2010 | Nam | H04L 27/0012 375/274 |
| 7,764,707 B2* | 7/2010 | Li | 370/465 |
| 7,817,656 B1* | 10/2010 | Deng et al. | 370/412 |
| 7,962,049 B2 | 6/2011 | Mateosky et al. | |
| 8,005,375 B2 | 8/2011 | Frankel | |
| 8,009,692 B2* | 8/2011 | Basso et al. | 370/465 |
| 8,009,985 B1* | 8/2011 | Roberts et al. | 398/47 |
| 8,023,396 B2* | 9/2011 | Hartman | 370/204 |
| 8,045,855 B2 | 10/2011 | Frankel | |
| 8,259,861 B2* | 9/2012 | Kuhtz | 375/334 |
| 8,401,117 B1* | 3/2013 | Su | H04L 27/0006 375/316 |
| 8,532,498 B2* | 9/2013 | Shpantzer | 398/184 |
| 8,553,551 B2* | 10/2013 | Spector | 370/235 |
| 8,707,137 B2* | 4/2014 | Arye | 714/774 |
| 2002/0099529 A1* | 7/2002 | Tang | H04L 1/0015 703/22 |
| 2002/0159121 A1* | 10/2002 | Spickermann | 359/188 |
| 2002/0181389 A1* | 12/2002 | Giannakis | H04L 25/022 370/208 |
| 2002/0186432 A1 | 12/2002 | Roorda et al. | |
| 2003/0091004 A1* | 5/2003 | Tang | H04L 1/0021 370/252 |
| 2003/0166395 A1* | 9/2003 | Von Elbwart | H04L 1/0003 455/130 |
| 2003/0231706 A1* | 12/2003 | Hwang | H04L 1/0003 375/219 |
| 2004/0156644 A1* | 8/2004 | Yasue et al. | 398/198 |
| 2004/0184398 A1* | 9/2004 | Walton et al. | 370/203 |
| 2004/0247314 A1* | 12/2004 | Kawarai | 398/27 |
| 2005/0036444 A1* | 2/2005 | Park et al. | 370/222 |
| 2005/0047517 A1* | 3/2005 | Georgios et al. | 375/267 |
| 2006/0029398 A1* | 2/2006 | Liu et al. | 398/188 |
| 2006/0037059 A1* | 2/2006 | Jin | H04N 5/4401 725/118 |
| 2006/0129525 A1* | 6/2006 | Rijpkema | 707/2 |
| 2007/0081475 A1* | 4/2007 | Telado | H04L 1/0003 370/255 |
| 2007/0110002 A1* | 5/2007 | Yang | H04L 1/0003 370/335 |
| 2007/0166032 A1 | 7/2007 | Frankel | |
| 2007/0230594 A1* | 10/2007 | Mo et al. | 375/260 |
| 2007/0253388 A1* | 11/2007 | Pietraski | 370/338 |
| 2007/0268814 A1* | 11/2007 | Li | 370/207 |
| 2008/0025728 A1 | 1/2008 | Shpantzer et al. | |
| 2008/0163002 A1* | 7/2008 | Frederiksen | H04L 1/0072 714/37 |
| 2008/0225381 A1* | 9/2008 | Heffner et al. | 359/325 |
| 2009/0003301 A1* | 1/2009 | Reial et al. | 370/342 |
| 2009/0022497 A1 | 1/2009 | Mateosky et al. | |
| 2009/0103931 A1 | 4/2009 | Grigoryan et al. | |
| 2009/0147896 A1 | 6/2009 | Frankel et al. | |
| 2009/0168922 A1* | 7/2009 | Malladi et al. | 375/316 |
| 2009/0169204 A1 | 7/2009 | Meagher et al. | |
| 2009/0169208 A1 | 7/2009 | Grigoryan et al. | |
| 2009/0169217 A1 | 7/2009 | Meagher et al. | |
| 2009/0196602 A1* | 8/2009 | Saunders et al. | 398/26 |
| 2009/0205007 A1 | 8/2009 | Woodward | |
| 2009/0214212 A1 | 8/2009 | Vorbeck et al. | |
| 2010/0008617 A1 | 1/2010 | Marrakchi El Fellah et al. | |
| 2010/0014500 A1* | 1/2010 | Lee | H04L 1/0017 370/342 |
| 2010/0021166 A1* | 1/2010 | Way | 398/79 |
| 2010/0054144 A1* | 3/2010 | Choi et al. | 370/252 |
| 2010/0083067 A1* | 4/2010 | Fujimoto | H04L 1/0002 714/748 |
| 2010/0142943 A1 | 6/2010 | Frankel et al. | |
| 2010/0260251 A1* | 10/2010 | Yokomakura | H04L 1/0003 375/232 |
| 2010/0297949 A1* | 11/2010 | Nakajima | H04L 1/0003 455/63.1 |
| 2010/0329686 A1 | 12/2010 | Frankel | |
| 2011/0013911 A1* | 1/2011 | Alexander et al. | 398/79 |
| 2011/0033195 A1 | 2/2011 | Frankel | |
| 2011/0122787 A1* | 5/2011 | Wang | H04B 17/336 370/252 |
| 2011/0176815 A1 | 7/2011 | Frankel et al. | |
| 2011/0229149 A1* | 9/2011 | Grubb et al. | 398/188 |
| 2011/0255870 A1 | 10/2011 | Grigoryan et al. | |
| 2012/0201130 A1* | 8/2012 | Liu et al. | 370/230 |
| 2013/0336649 A1* | 12/2013 | Essiambre et al. | 398/27 |

OTHER PUBLICATIONS

Shafik et al, On the Extended Relationships Among EVM, BER and SNR as Performance Metrics, Dec. 2006, ICECE, pp. 408-411.*

* cited by examiner

HIGH SPEED OPTICAL COMMUNICATION SYSTEMS AND METHODS WITH FLEXIBLE BANDWIDTH ADAPTATION

FIELD OF THE INVENTION

Generally, the field of art of the present disclosure pertains to fiber optic transmission, and more particularly, to flexible bandwidth adaptation in high speed optical communication systems and methods through modulation format adjustment based on optical signal-to-noise ratio (OSNR), bandwidth demand, transceiver health, and the like.

BACKGROUND OF THE INVENTION

Conventionally, trends in communication are continuing to show rapid growth in network bandwidth requirements. In particular, commercial fiber-optic networks are seeing a rapid transition from 10 Gbps channels to 100 Gbps channels. Research results for 1000 Gbps channels are becoming commonplace, too. As individual channel rates scale beyond 100 Gbps, signal-to-noise ratio (SNR) becomes more critical. In a conventional system, SNR is used to determine degradation, failure, or fault conditions whereby protection switching is used. There does not exist a system and method for adaptively configuring various levels of throughput (e.g., discrete or continuous) when SNR varies. Further, systems exist utilizing optical virtual concatenation along with optical packet switching to provide a programmable or dynamic expansion and contraction of bandwidth over time driven by changes in a demand for bandwidth and/or operational requirement changes over time. However, there does not exist an integrated approach to manage optical bandwidth based on SNR, demand, and the like.

BRIEF SUMMARY OF THE INVENTION

In an exemplary embodiment, a fiber optic system includes a transmitter configured to utilize a plurality of modulation formats, and a receiver communicatively coupled to the transmitter and configured to utilize a plurality of modulation formats, wherein the transmitter and the receiver are cooperatively configured to set a modulation format of the plurality of modulation formats based upon signal-to-noise ratio associated therewith. The receiver can be configured to sense the signal-to-noise ratio through any of a bit error rate, a corrected forward error correction count, a symbol error rate, a constellation estimate, etc., and the receiver can be configured to communicate with the transmitter. The fiber optic system can further include transmitter data circuitry coupled to the transmitter, and receiver data circuitry coupled to the receiver, wherein each of the transmitter data circuitry and the receiver data circuitry is configured to adapt data between the transmitter and the receiver such that any changes between the plurality of modulation formats are performed in a hitless manner. The fiber optic system can further include a plurality of timeslots formed between the transmitter data circuitry and the receiver data circuitry, wherein a number of the plurality of timeslots is based at least on client data demands. Each of the transmitter and the receiver can be configured to cycle through a predetermined sequence of the plurality of modulation formats.

The plurality of modulation formats can include Binary Phase Shift Keying, Quadrature Phase Shift Keying, 8-Quadrature Amplitude Modulation, and 16-Quadrature Amplitude Modulation. Each of the transmitter and the receiver can be configured with a plurality of sub-channels. The transmitter and the receiver can be cooperatively configured to reduce bandwidth by excluding failed subsystems associated with any of the plurality of sub-channels. The fiber optic system can further include at least one intermediate optical transceiver between the transmitter and the receiver, and a mechanism for signaling adaptive modulation format changes between the transmitter, the at least one intermediate optical transceiver, and the receiver. The mechanism for signaling can be configured for any of the transmitter, the at least one intermediate optical transceiver, and the receiver to request a decrease in bandwidth due to degradation of the optical signal-to-noise ratio, and for the transmitter to request an increase in bandwidth. The fiber optic system can further include an in-band communication channel for signaling adaptive modulation format changes between the transmitter and the receiver, and a blind system recovery mechanism to establish the in-band communication channel between the transmitter and the receiver.

In another exemplary embodiment, an optical transceiver includes a transmitter configured to utilize a plurality of modulation formats, wherein the transmitter is communicatively coupled to a far end receiver, and a receiver communicatively configured to utilize a plurality of modulation formats, wherein the receiver is communicatively coupled to a far end transmitter, wherein the transmitter and the far end receiver are cooperatively configured to set a modulation format of the plurality of modulation formats based upon signal-to-noise ratio associated therewith, and wherein the receiver and the far end transmitter are cooperatively configured to set a modulation format of the plurality of modulation formats based upon signal-to-noise ratio associated therewith. The optical transceiver can further include a first plurality of sub-channels transmitted by the transmitter, and a second plurality of sub-channels received by the receiver, wherein each of the first plurality of sub-channels and the second plurality of sub-channels includes one of the plurality of modulation formats. The receiver can be configured to sense the optical signal-to-noise ratio through any of a bit error rate, a corrected forward error correction count, a symbol error rate, a constellation estimate, etc., and wherein the receiver is configured to communicate to the far end transmitter. The transmitter can include configurable modulators configured to provide any of Binary Phase Shift Keying, Quadrature Phase Shift Keying, 8-Quadrature Amplitude Modulation, and 16-Quadrature Amplitude Modulation.

In yet another exemplary embodiment, a flexible bandwidth adaptation method includes monitoring at least one aspect of an optical link at a network element; responsive to the at least one aspect, computing an improved modulation scheme of a plurality of modulation schemes for the optical link; and if the improved modulation scheme is computed, changing to the improved modulation scheme. The monitoring can include, at an originating network element of the optical link, monitoring for transceiver health and client bandwidth demand, and, at a terminating network element of the optical link, monitoring for signal-to-noise ratio. The flexible bandwidth adaptation method can further include the originating network element communicating to the terminating network element a degradation in the signal-to-noise and a request to adapt to a different modulation scheme based thereon. The flexible bandwidth adaptation method can further include, at an intermediate network element of the optical link, monitoring for signal-to-noise ratio, and communicating a degradation in the optical signal-to-noise and a request to adapt to a different modulation scheme based thereon. The flexible bandwidth adaptation method can further include, prior to changing to the improved modulation scheme, buffering data such that the change to the new modulation scheme is hitless.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, flexible bandwidth adaptation systems and methods are described for terabit optical communication systems. The flexible bandwidth adaptation systems and methods include an optical transceiver, an optical network, and methods associated therewith. The flexible bandwidth adaptation systems and methods provide scalable and fault tolerant communication over fiber, redundant transmission of data to mitigate system anomalies and hardware failures, improve on the 'all or nothing' network operational scenario during times of degraded SNR (i.e., protection switch or not), adapt to underlying bandwidth demands, and the like. In an exemplary embodiment, high speed optical transceivers (e.g., 100 Gbps+) include support for a plurality of modulation formats in the same device, with the selection of modulation format based on the flexible bandwidth adaptation systems and methods.

Figure 1:
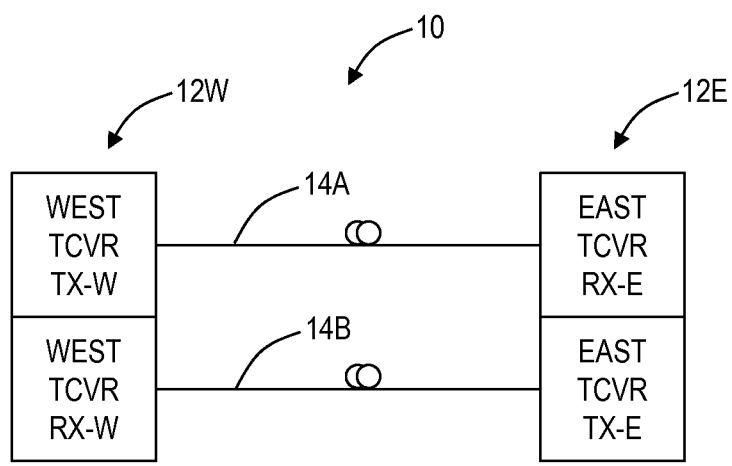
FIG. 1 is a diagram of a high speed optical system in accordance with the flexible bandwidth adaptation systems and methods.

Referring to FIG. 1, in an exemplary embodiment, a diagram illustrates a high speed optical system 10 in accordance with the flexible bandwidth adaptation systems and methods.

The optical system 10 includes transceivers 12E, 12W interconnected therebetween by fibers 14A, 14B forming a bidirectional communication link. Specifically, the transceiver 12W includes a transmitter (TX) communicatively coupled to a receiver (RX) on the transceiver 12E via the fiber 14A, and the transceiver 12E includes a TX communicatively coupled to a RX on the transceiver 12W via the fiber 14B. Practical, low-power and cost-effective hardware can only be implemented by leveraging very high levels of optoelectronic integration in the transceivers 12E, 12W, such that the full channel capacity goes through a single hardware block. Further, increasing spectral efficiency of the modulation format necessarily reduces optical un-regenerated reach and may reduce available system margins. Transponder implementations that satisfy both high levels of integration, such as the transceivers 12E, 12W, high capacity requirements, and long un-regenerated reaches are typically implemented with coherent receivers and electronic signal processing. In an exemplary embodiment, the transceivers 12E, 12W utilize multi-level modulation and electrical signal processing, and also support a plurality of different modulation formats in a same device. Electronic processing of optical signal opens up an opportunity to dynamically change transceiver characteristics such that it can adapt overall throughput capacity and spectral efficiency to link conditions.

Figure 2:
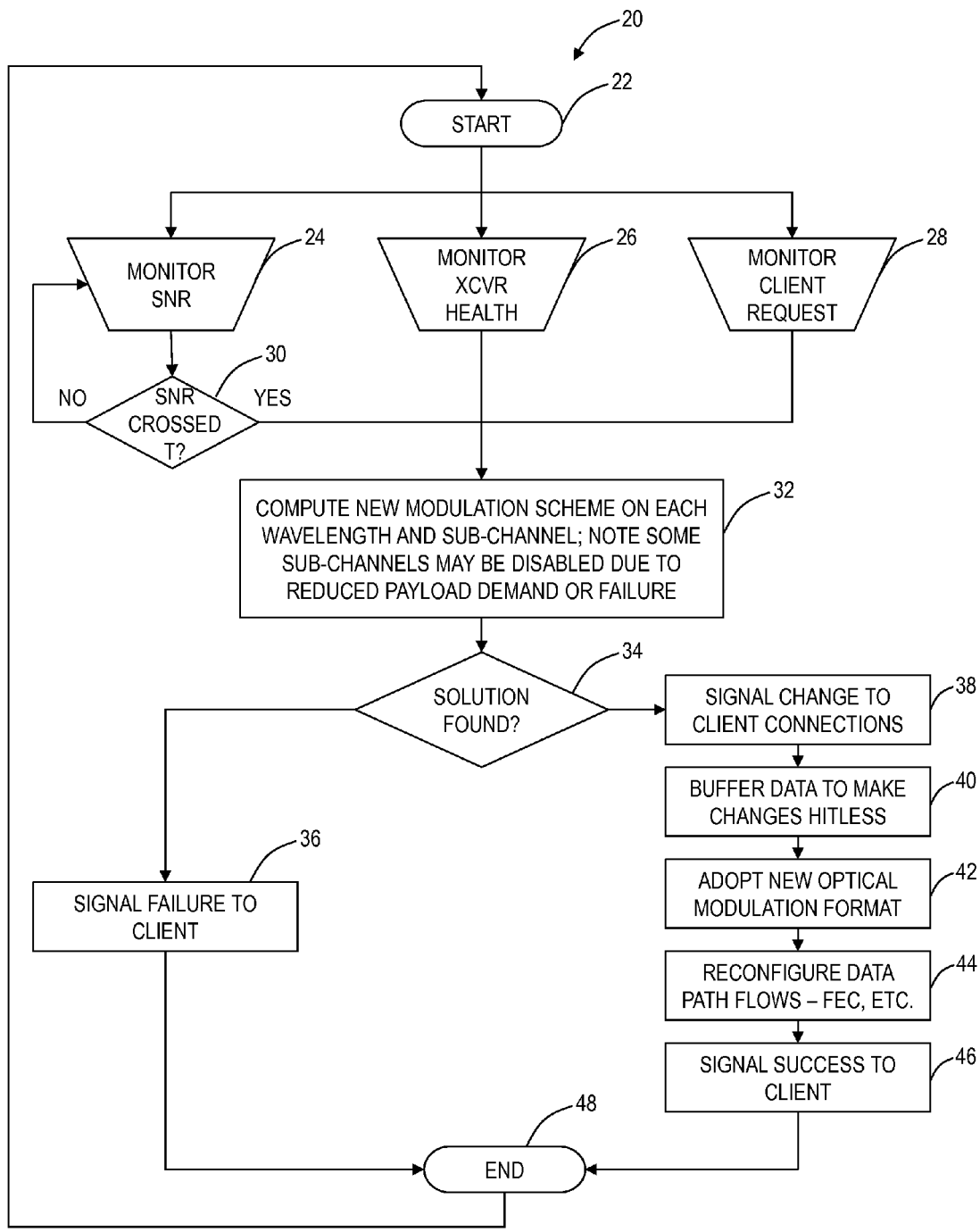
FIG. 2 is a flowchart of a transceiver operation method in accordance with the flexible bandwidth adaptation systems and methods.

Referring to FIG. 2, in an exemplary embodiment, a flowchart illustrates a transceiver operation method 20 in accordance with the flexible bandwidth adaptation systems and methods. The transceiver operation method 20 can be implemented on the transceivers 12E, 12W of the optical link system 10. Variously, the transceiver operation method 20 may continuously operate at/on the transceiver 12E, 12W (step 22). The transceiver operation method 20 is configured to continuously monitor SNR (step 24), transceiver health (step 26), and client requests (step 28). For example, the transceiver operation method 20 may continuously monitor SNR to check if a threshold is crossed (step 30). Note, in step 30, the transceiver operation method 20 checks if the threshold is crossed. The method 20 can also operate under additional conditions such as SNR increasing above another threshold such that additional bandwidth can be supported through another modulation scheme. That is, generally, the transceiver operation method 20 is configured to adapt modulation based on SNR changes, both positive and negative. The transceiver operation method 20 is configured to modify the transceivers (i.e. steps 34-48) based on the monitoring steps 24, 26, 28. In an exemplary embodiment, the focus of the method 20 is on payload size adaptation and framing, and on state bandwidth advertisement to both signal input and output connections, and advertizing same to the corresponding clients.

The monitoring steps 24, 26, 28 can include sensing SNR, forward error correction information, signal quality Q, a symbol error rate, and any other optical performance monitoring aspects either directly monitored or computed. In an exemplary embodiment, the method 20 utilizes SNR which can be monitored or calculated through various methods, such as an estimate based on forward error correction data. Based on the steps 24, 26, 28, the transceiver operation method 20 is configured to compute a new, improved modulation scheme on each wavelength and/or sub-channel of the transceiver (step 32). Of note, the transceiver may include modulation with a plurality of wavelengths and/or sub-channels, and some of the sub-channels may be disabled due to reduced payload demands, failures, etc. The transceiver operation method 20 checks if a new modulation scheme solution is found (step 34). If not, the transceiver operation method 20 signals a failure to a client (step 36). The failure may also be communicated to a management system, to a far end, etc. using in-band or out-of-band communications. Here, the failure indicates that the transceiver is unable to adapt to a modulation scheme to support current required conditions at the transceiver, e.g. based on the steps 24, 26, 28.

If a new modulation scheme is found (step 34), the transceiver operation method 20 signals a change to client connections (step 38). The transceiver may also internally buffer data from the clients to make the modulation scheme changes hitless (step 40). The transceiver adopts the new optical modulation format (step 42), reconfigures data path flows, such as forward error correction, etc. (step 44), and signals success to the clients (step 46). Subsequent to steps 36, 46, the transceiver operation method 20 ends and may return to step 22 for continual monitoring in the steps 24, 26, 28. Of note, the transceiver operation method 20 is operated cooperatively at the transceivers 12E, 12W over the optical system 10.

Assume, for purposes of the foregoing description, the transceiver operation method 20 is implemented between the transceiver 12W and the transceiver 12E over the fiber 14A, i.e. the transmitter of the transceiver 12W is communicatively coupled to the receiver of the transceiver 12E over the fiber 14A. In a first exemplary scenario associated with the transceiver operation method 20, link SNR drops on the fiber 14A below a margin acceptable for a current throughput over the fiber 14A. The SNR may be measured in the electrical domain at the receiver on the transceiver 12E. In response, the receiver on the transceiver 12E adapts the channel modulation and reduces overall throughput. This reduced throughput is advertised to the transmitter on the transceiver 12W and to associated clients. In a second exemplary scenario associated with the transceiver operation method 20, SNR may recover and increase, and here the receiver on the transceiver 12E may adapt channel modulation to increase overall throughput. This increased throughput is advertised to the transmitter on the transceiver 12W and to associated clients.

The first and second exemplary scenarios are associated with step 24 of the transceiver operation method 20 and focus on link SNR changing sufficiently to require changes in the optical modulation format, and impacting overall throughput capacity. Fiber-optic link Signal to Noise (SNR) can change for a variety of reasons. Most common are physical fiber bends or kinks, which induce excess optical loss and may affect both Signal Power and Optical Signal to Noise (OSNR) at the receiver. These are observed frequently in metro area networks, where fiber cables share conduits and access space with other electrical, power and sewer services, and therefore see frequent maintenance personnel visits. Other reasons maybe associated with optical line system failures, e.g. Raman pump failures, control loop software failures, various component failures, etc.

The transceiver operation method 20 provides an adaptive solution to bandwidth allocation based on signal-to-noise (SNR) and/or receiver input bit error rate (BER) in the optical system 10. Any overall maximum throughput is contemplated, and the exemplary embodiments described herein use a 1 Tbps maximum throughput in a given direction. Systems tend to be bi-directional or full-duplex in nature, but that is also not required. In an exemplary embodiment, the transceivers 12E, 12W utilize an electrical signal processor (ESP) based Orthogonal Frequency Division Multiplexed (OFDM) architecture, designed to support ten orthogonal subcarrier channels per wavelength, with each subcarrier supporting a fixed baud rate of 2.8 GBaud. To achieve 1 Tbps of uni-directional throughput, the optical system 10 is polarization multiplexed on each wavelength (or lambda) and requires five wavelengths in the system to achieve the advertised maximum throughput. In an exemplary embodiment, the optical link 10 uses a 16-QAM (4-bits/sym or baud) modulation scheme: 2-pols×5-lambdas×10-subC×4-bits/Baud×2.8-Gbaud=1.12 Tbps.

Advantageously, the transceiver operation method 20 provides adaptive, robust and error-free data transport in the optical system 10 while experiencing fluctuations in SNR over time and varying widely (e.g., 1 to 15 dB fluctuations). For a fixed symbol rate and a given SNR operating point, the optical system 10 trades or 'selects' the proper energy per bit setting or spectral efficiency, and data mapping to optimally support a present operating point on the fibers 14, defined by Es/No (i.e., SNR). As the SNR falls, spectral efficiency must follow to maintain a specified network BER operating point. In optical networking the required BER is generally very, very low (typically $10^{-12}$, $10^{-15}$, etc.). The transceiver operation method 20 uses channelization and a flexible and reconfigurable, multi-level digital modulation scheme, which allows for the adaptation in capacity in reaction to SNR variation. In an exemplary embodiment, Binary Phase Shift Keying (BPSK), 4-Quadrature Amplitude Modulation (QAM) (note, 4-QAM is also referred to as Quadrature Phase Shift Keying (QPSK)), 8-QAM, 16-QAM, etc. are proposed discrete modulation levels for the fixed 2.8 Gbaud sub-channels, which can be changed to accommodate ~3 dB SNR changes on the line. Additionally, other discrete modulation levels are also contemplated such as ring constellations, 64-QAM and higher, and the like.

Table below illustrates how increasing constellation size increases channel capacity, but also require increasing SNR:

| Modulation Format | Bits/Symbol | Required Es/No (SNR) at $10^{-12}$ BER (dB) |
|---|---|---|
| BPSK | 1 | 14.0 |
| 4-QAM (QPSK) | 2 | 17.5 |
| 8-QAM | 3 | 21.0 |
| 16-QAM | 4 | 24.5 |
| 32-QAM | 5 | 27.5 |
| 64-QAM | 6 | 30.5 |

In a third exemplary scenario associated with the transceiver operation method 20, a fraction of either of the transceivers 12E, 12W fails. Here, the transceiver operation method 20 may reconfigure internal connections, reconfigure bandwidth, or, if required, perform a protection switch. First, the transceiver can attempt to reconfigure internal connectivity in such a way as to continue supporting full capacity over the optical system 10, while bypassing failed hardware. This is possible if there is excess margin on the optical system 10. Alternatively, the transceiver can attempt to reduced the throughput as outlined in the transceiver operation method 20. The third exemplary scenario is associated with step 26. High-capacity, highly integrated transceivers (such as the transceivers 12E, 12W) can use a parallelized architecture. In an exemplary embodiment, each of the transceivers 12E, 12W uses 2-polarizations×5-lambdas×10-subC×4-bits/Baud×2.8-Gbaud to provide 1.12 Tbps of line side capacity, assuming 16-QAM modulation. It is probable that a failure of a laser, photo-detector, electronic circuit block, or an electrical connection will affect only a small fraction of the overall payload capacity in the transceivers 12E, 12W. If such a partial failure occurs and is detected, the transceivers 12E, 12W may reconfigure modulation format, payload flow, etc. and signal changes to the client and a far end if such a failure resulted in an overall loss of payload throughput.

In a fourth exemplary scenario associated with the transceiver operation method 20, the transceiver can reconfigure bandwidth based on client-side requests (step 28). The transceiver operation method 20, in addition to monitoring signal quality and hardware health, can also adapt the optical system 10 based on operational requirement changes from client facilities, where cost and/or peak use varies due to time of day changes, or end-user demand fluctuations. One such example would be extreme high demand situations that is predictable and known in advance, with an end customer willing to pay a premium for higher performance. Also the converse of this, where certain wavelength services require a lower bandwidth connection for cost savings. In a fifth exemplary scenario associated with the transceiver operation method 20, the transceiver operation method 20 can prevent protection switching being performed on a full (e.g., 1 Tbps) data payload.

Figure 3:
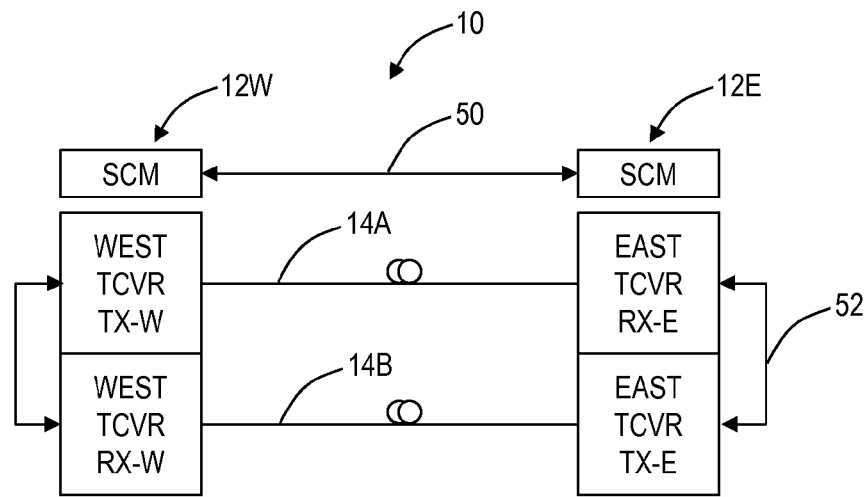
FIG. 3 is a diagram of the optical system of FIG. 1 illustrating communication aspects associated therewith in accordance with the flexible bandwidth adaptation systems and methods.
Figure 4:
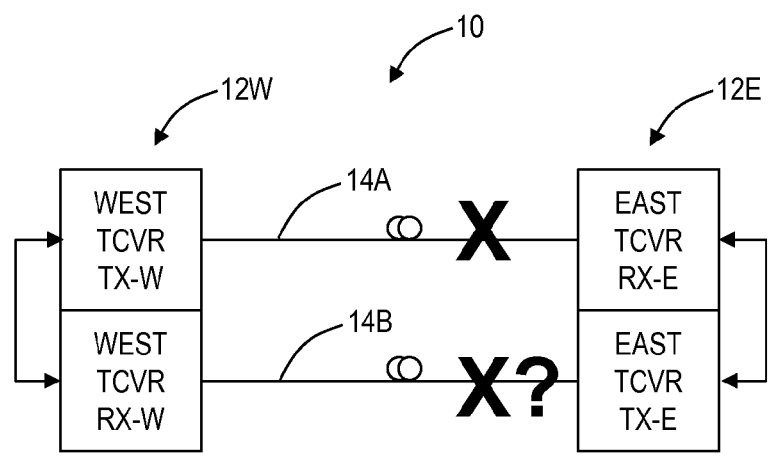
FIG. 4 is a diagram of the optical system of FIG. 1 illustrating an exemplary operation in accordance with the flexible bandwidth adaptation systems and methods.

Referring to FIGS. 3 and 4, in exemplary embodiments, diagrams illustrate the optical system 10 implementing the transceiver operation method 20 in accordance with the flexible bandwidth adaptation systems and methods. In particular, FIG. 3 illustrates exemplary communication aspects of the optical system 10. The transceivers 12E, 12W may have a service channel 50 therebetween for communications, and each of the transceivers 12E, 12W may have local communications 52 therebetween as well as communications to subtending clients (not shown). The service channel 50 may be an in-band or an out-of-band channel. For example, in-band may include overhead associated with Optical Transport Network (OTN), Synchronous Optical Network (SONET), Synchronous Digital Hierarchy (SDH), Ethernet, etc. In-band may also include a optical service/supervisory channel (OSC), etc. Out-of-band may include an overlaid data network, such as User Datagram Protocol (UDP) over Internet Protocol (IP). Accordingly, the transceivers 12E, 12W are configured to communicate operations, administration, maintenance, and provisioning (OAM&P) functionality therebetween. The local communications 52 mean that the transmitter and receiver on each of the transceivers 12E, 12W are in communication therebetween. This may be through such devices being implemented in a same module, sharing a backplane connection, having a common controller for OAM&P, etc.

FIG. 4 illustrates an exemplary operation on the optical system 10. In particular, the optical system 10 of FIG. 4 assumes in-band communication between the transceivers 12E, 12W, i.e. the service channel 50 is carried over the fibers 14A, 14B. In an exemplary embodiment, the optical system 10 may include a blind system recovery following a state-change or network anomaly. One of the key features of the optical system 10 is an ability to automatically change its operating point upon demand, or upon sensing SNR degradation. The optical system 10 must be able to do this even if the optical link degrades severely for a temporary period. This gives an end user (network provider) a form of 'protection' for some amount of network traffic at various discrete operating points. End-to-end communication is key to insure robust, verifiable operation after a state change.

For the optical system 10 and the transceiver operation method 20, an in-band communication link is ideal for end-to-end modulation mode change signaling, but the optical system 10 has to recover if that in-band link temporarily becomes degraded or non-functional due to line SNR degradation. Accordingly, the optical system 10 includes several mechanisms for this so-called blind recovery. Assume the optical system 10 is operating normally, in a bi-directional topology, at a particular line SNR and associated modulation settings. A Line anomaly occurs and one or both receivers which detect any of a Loss of Frame (LOF), Loss of Multi-frame (LOM), or degraded SNR, causing the in-band communication link to fail. The optical system 10 may include two of the following approaches.

First, upon receiver SNR change detection, or LOF/LOM detection, the receiver commands its associated near-end transmitter to set each sub-channel to a prescribed, but different modulation format, and the receiver does the same. Once demodulation is detected on at least one sub-carrier, reestablishment of the in-band communication link can occur, and then can proceed with appropriate full recovery for measured SNR/desired system set-point. Second, upon receiver SNR change detection, or LOF/LOM detection, receiver commands its associated near-end transmitter to set each sub-channel to fixed modulation format, and have transmitter change format once every 'Y' seconds. The receiver will also fix and change at much higher rate 'Y/10' seconds, ensuring receiver can hit all formats within transmitter time interval. Once found, reestablishment of the in-band communication link can occur, and then can proceed with appropriate full recovery for measured SNR/desired system set-point.

In an exemplary embodiment, the transceivers 12E, 12W can each be configured to move to identical modulation formats in a predetermined fashion. Specifically, based on SNR changes (better or worse), the transceivers 12E, 12W can cycle through a predetermined modulation format change cycle. If the receiver cannot recover signal, then the transmitter is stepped to the next modulation format across all sub-channels. For example, the transmitter and receiver can switch between a predetermined set of varied modulation formats for specified periods of time. In another exemplary embodiment, the transmitter and receiver can be configured to switch between a predetermined set of varied modulation formats on different sub-carriers to see which ones work. For Example, sub-carrier 1 to 16QAM, sub-carrier 2 to 8PSK, sub-carrier 3 to QPSK, sub-carrier 4 to BPSK, etc. The end points will be able to determine which sub-channels are operable and determine the highest bandwidth option based thereon.

Figure 5:
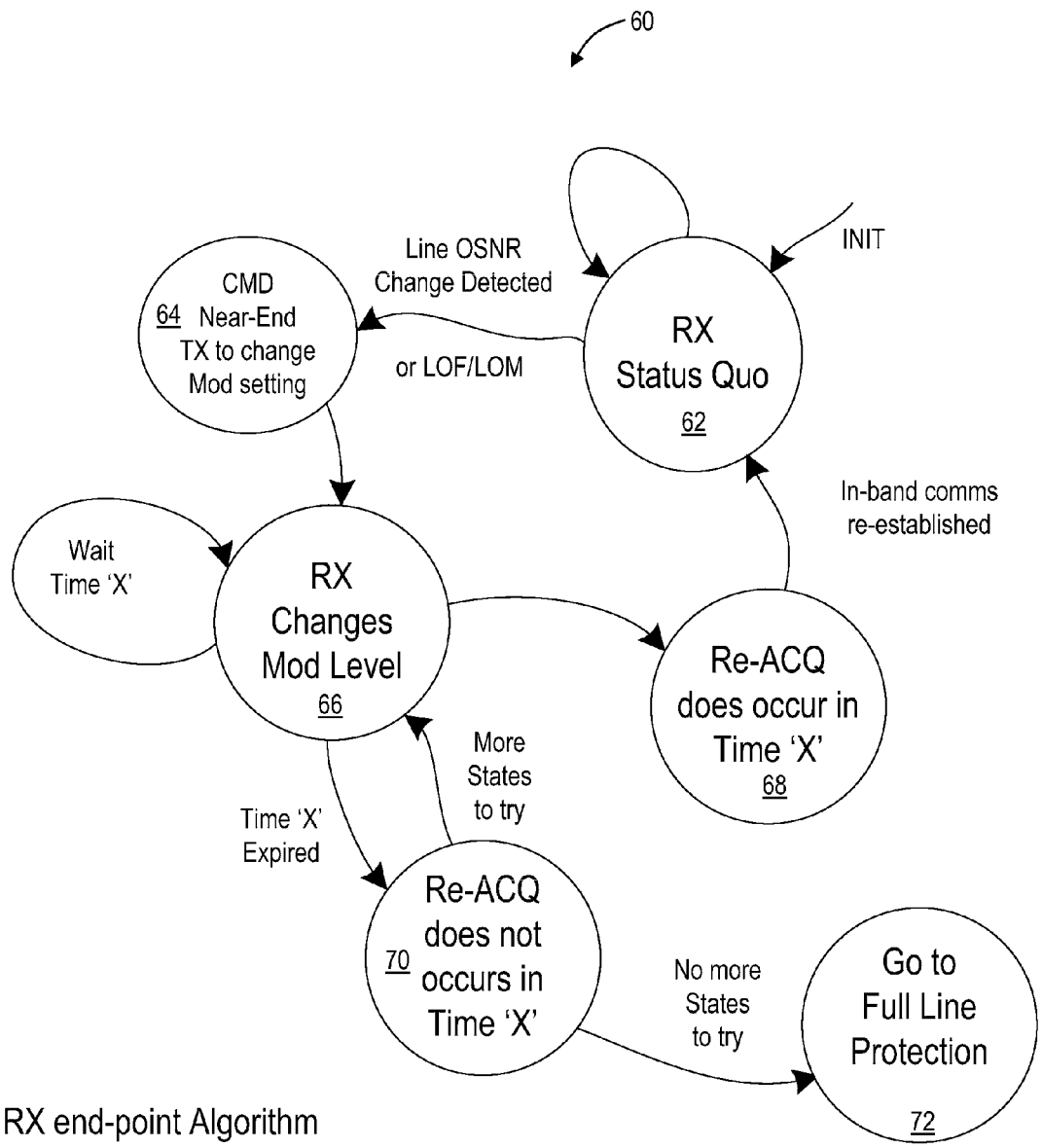
FIG. 5 is a state diagram of a receive-side method for the transceivers of the optical system in accordance with the flexible bandwidth adaptation systems and methods.

Referring to FIG. 5, in an exemplary embodiment, a state diagram illustrates a receive-side method 60 for the transceivers 12E, 12W in accordance with the flexible bandwidth adaptation systems and methods. The receive-side method 60 is implemented in the receiver of the transceivers 12E, 12W for maintaining an in-band communication link with a far-end transmitter. The receive-side method 60 includes states 62-72 and associated transitions therebetween. First, a state 62 is a receiver operating normally, i.e. 'status quo.' The receiver may be initialized to this state and may operate continually in this state under normal operation. If the receiver experiences an SNR change, LOF/LOM, etc., the receiver may enter a state 64 where the receiver commands its associated near-end transmitter to change its modulation setting. Note, entry to the state 64 assume loss of in-band communications. The receiver proceeds to a state 66 where the receiver changes its modulation levels and waits a predetermined time, X. From the state 66, if reacquisition occurs within the predetermined time, to state 68, then in-band communication is reestablished and the receiver proceeds back to the state 62. If the reacquisition does not occur with the predetermined time, the receiver enters a state 70 and the receiver either has more states to try (i.e., modulation states) and proceeds back to the state 66 to retry, or the receiver has failed with all states, and the receiver goes to a state 72 where the receiver must go to a line protection.

Figure 6:
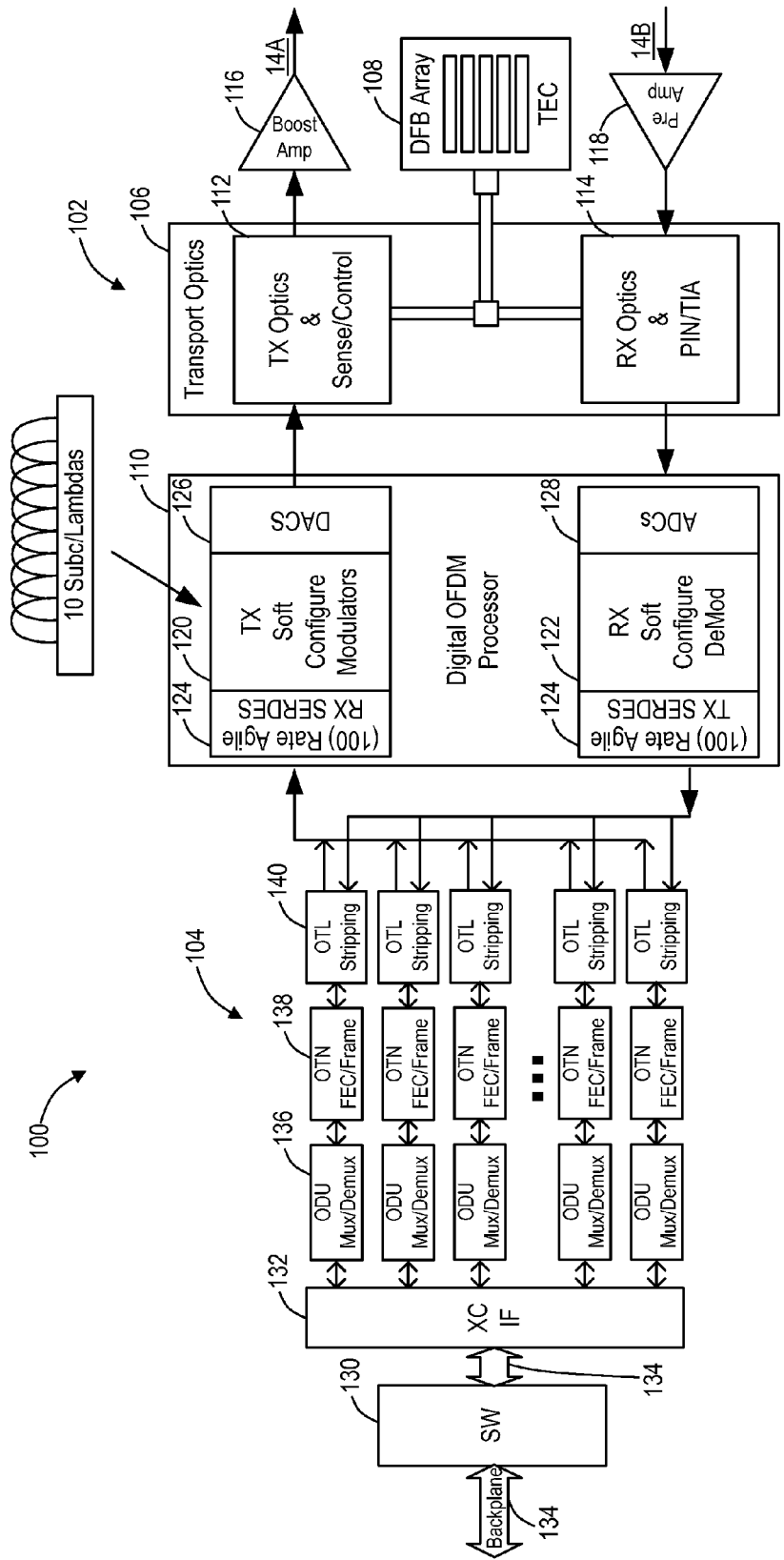
FIG. 6 is a block diagram of an exemplary implementation of a transceiver for use in the optical system and/or with the transceiver operation method.

Referring to FIG. 6, in an exemplary embodiment, a block diagram illustrates an exemplary implementation of a transceiver 100 for use in the optical system 10 and with the transceiver operation method 20. For example, the transceivers 12E, 12W may include the transceiver 100. The transceiver 100 includes both an optical section 102 and a data section 104. The optical section 102 is generally configured to implement functions related to modulation scheme change and the like and the data section 104 is generally configured to implement bandwidth adaptation based thereon. The optical section 102 includes transport optics 106, a distributed feedback laser (DFB) array 108 coupled to the transport optics 106, and a digital OFDM processor 110. The DFB array 108 can include a plurality of wavelengths for modulation/demodulation thereon by the transport optics 106, and a thermoelectric cooler (TEC) for maintaining wavelength control.

The transport optics 106 include a transmitter optics section 112 with sensing and control and a receiver optics section 114 with a PIN diode and a transimpedance amplifier (TIA). The transmitter optics section 112 can connect to a boost/post amplifier 116 that may be coupled to the fiber 14A, and the receiver optics section 114 can connect to a pre amplifier 118 that may be coupled to the fiber 14B. The digital OFDM processor 110 includes configurable modulators 120 and configurable demodulators 122. The modulators 120 and the demodulators 122 are configured to implement the changing of the modulation schemes as described herein. The modulators 120 and the demodulators 122 are configured to communicate with the data section 104 through a rate agile serializer/deserializer (SERDES) 124. The modulators 120 are configured to communicate with the transmitter optics section 112 through digital-analog converters (DACs) 126. The demodulators 122 are configured to communicate with the receiver optics section 114 through analog-digital converters (ADCs) 128. The demodulators 122 can be configured to sense/monitor line SNR for communication to a far-end transceiver 100 for adjustments based thereon.

In an exemplary embodiment, the data section 104 utilizes Optical Transport Network (OTN), but those of ordinary skill in the art will recognize any protocol is contemplated herewith. The data section 104 can include an OTN mux/demux framer that can interface to a switch 130 for data to exchange with the optical section 102. For example, the switch 130 can include a packet switch, a time division multiplexing (TDM) switch, etc., and can be communicatively coupled to a cross connect (XC) interface 132 in the data section 104 through a backplane 134 or the like. From the XC interface 132, the data section 104 includes a plurality of lanes each with an Optical channel Data Unit mux/demux 136, an OTN FEC/framer 138, and an OTL stripping block 140. In operation, the various components of the data section 104 are configured to interface an amount of bandwidth as required to the optical section 102.

In an exemplary embodiment, the transceiver 100 is a 280 Gbps to 1.12 Tbps SNR-driven adaptive optical transport system. The transmitter optics section 112 can support five polarization multiplexed wavelengths×ten sub-channels per wavelength at 2.8 GBaud per sub-channel. The modulators/demodulators 120, 122 are digital, programmable modem that can support BPSK, QPSK, 8-QAM, and 16-QAM. Bandwidth in the transceiver 100 can be reconfigured in 2.8 Gbps increments as needed or dictated by SNR. With BPSK, one-bit/baud symbol is provided for 2.8 Gbps/sub-ch=280 Gbps (ten sub-channels). With QPSK, two-bit/baud symbol is provided for 5.6 Gbps/sub-ch=560 Gbps (ten sub-channels, 5 wavelengths). With 8-QAM, three-bit/baud symbol is provided for 8.4 Gbps/sub-ch=840 Gbps (ten sub-channels, 5 wavelengths). With 16-QAM, four-bit/baud symbol is provided for 11.2 Gbps/sub-ch=1120 Gbps (ten sub-channels, 5 wavelengths). For the data section 104, 1120 Gbps: 10×112 Gbps can be carried as an Optical channel Transport Unit level 4 (OTU4) per wavelength, 840 Gbps: 10×84 Gbps can be carried as an OTU3.x per wavelength, 560 Gbps: 10×56 Gbps can be carried as an OTU3.y per wavelength, and 280 Gbps: 10×28 Gbps can be carried as an OTU2.y per wavelength. Note, the foregoing describes the transceiver 100 with non-standard OTN rates (28G, 56G, 84G, etc.) for illustration purposes, but the flexible bandwidth adaptation systems and methods contemplate using standard OTN rates (OTU2/10G, OTU3/40G, OTU4/100G, etc.) or any other rates. Also, along with transport container rates, those of ordinary skill in the art will recognize there is no limitation on modulation formats or overall throughput rate as well. The exemplary embodiments described herein are provided as illustrative examples.

Figure 7:
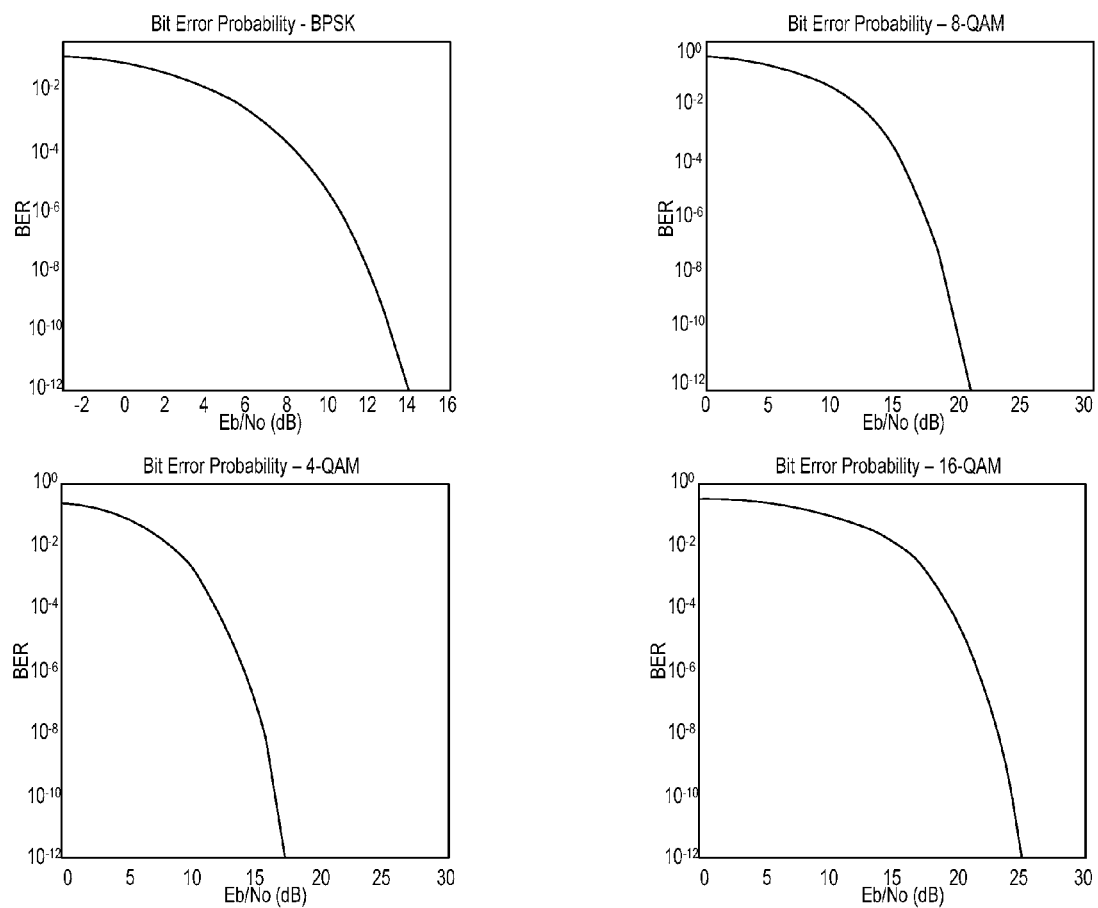
FIG. 7 is a set of graphs of symbol error rate versus signal-to-noise ratio (SNR) at a bit error rate (BER) of $10^{-12}$ for the transceiver of FIG. 6.

Referring to FIG. 7, in an exemplary embodiment, graphs illustrate symbol error rate versus SNR at BER of $10^{-12}$ for the transceiver 100. From these graphs and the table of modulation formats described herein, it is shown that approximately 3 dB is required for SNR at each step in the modulation scheme.

Figure 8:
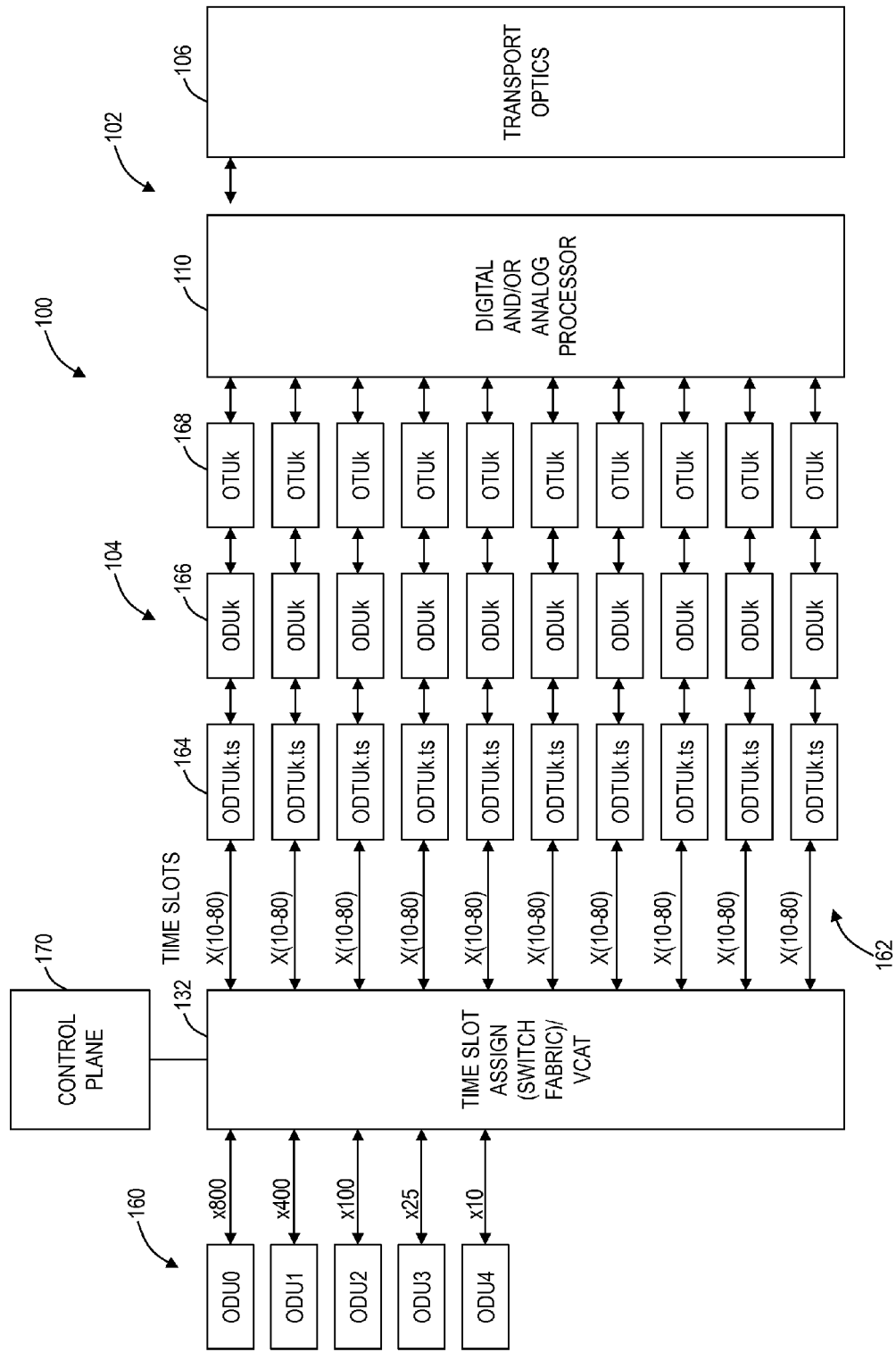
FIG. 8 is a block diagram of the transceiver of FIG. 6 focusing on the data section and time slots associated therewith.

Referring to FIG. 8, in an exemplary embodiment, a block diagram illustrates the transceiver 100 focusing on the data section 104. In an exemplary embodiment, the transceiver 100 uses OTN transport supporting non-standard rates with ODU and ODUflex multiplexing. Mapping and timeslot assignments are performed and managed by the switch 132 with asynchronous mapping protocol (AMP), Generic Mapping Protocol (GMP) and Generic Framing Protocol-Frame (GFP-F) mappings if required. On a client-side of the transceiver 100, the transceiver 100 can support various tributary types and rates, such as standard ODU(0/1/2/3/4) tributaries, ODUFlex(Constant Bit Rate (CBR)) and ODUFlex(GFP) for TDM and Packet based traffic.

In an exemplary embodiment, the transceiver 100 supports a variable number of timeslots in the digital section 104 based on settings in the optical section 102. For example, a single timeslot may be approximately 1.25 Gbps, and the transceiver 100 can support four discrete bandwidth settings based on SNR, demand, etc. The four discrete bandwidth settings can include 800 Timeslots, or 1.12 Tb/s aggregate bandwidth at the highest SNR (16QAM); 600 Timeslots, or 0.840 Tb/s aggregate bandwidth at a level of the maximum SNR minus 3.5 dB (8-PSK); 400 Timeslots, or 0.560 Tb/s aggregate bandwidth at a level of the maximum SNR minus 7 dB (QPSK); and 200 Timeslots, or 0.280 Tb/s aggregate bandwidth at a level of the maximum SNR minus 10 dB (BPSK). In particular, data units 160 may include 800 ODU0s, 400 ODU1s, 100 ODU2s, 25 ODU3s, 10 ODU4s, or combinations thereof for the 100-800 timeslots.

The data units 160 are managed by the interface 132 which is coupled to ten output lines 162, each of which includes 10 to 80 timeslots. The output lines 162 are coupled to OTN framing/deframing circuitry 164, 166, 168 which interfaces the 10 to 80 timeslots to the digital OFDM processor 110 for transmission thereof. In an exemplary embodiment, mapping ODUk signals from the data units 160 to line port time slots directly can be used when all OTUk framers 164, 166, 168 are set to an identical number of time slots and Multi-frame Alignment Signal (MFAS) is aligned. In another exemplary embodiment, mapping ODUk signals from the data units 160 to line port time slots using Virtual Concatenation (VCAT) to stripe ODUj's across multiple OTUk framers 164, 166, 168 with varied number of time slots and random MFAS alignments.

In an exemplary embodiment, a control plane 170 may be utilized with the transceiver 170 for bandwidth advertisement and control thereof. Generally, the control plane 170 includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane 170 may utilize Automatically Switched Optical Network (ASON) as defined in G.8080/Y.1304, Architecture for the automatically switched optical network (ASON) (02/2005), the contents of which are herein incorporated by reference, and the like. In another exemplary embodiment, the control plane 170 may utilize Generalized Multi-Protocol Label Switching (GM-PLS) Architecture as defined in Request for Comments: 3945 (10/2004), the contents of which are herein incorporated by reference, and the like. In yet another exemplary embodiment, the control plane 170 may utilize Optical Signaling and Routing Protocol (OSRP) from Ciena Corporation of Linthicum, MD which is an optical routing protocol similar to PNNI (Private Network-to-Network Interface) and MPLS (Multi-protocol Label Switching). Those of ordinary skill in the art will recognize the network and the control plane may utilize any type control plane for with the transceiver 100 and the flexible bandwidth adaptation systems and methods.

For advertising bandwidth availability, the control plane 170 can map sub network connections (SNC) to individual or groups of time slots on the transceiver 100. Since each time slot carries approximately 1.25 Gbps, multiple times slots can be used to cover SNCs requiring more than 1.25 Gbps. The transceiver 100 can be configured to advertise the availability of time slots to the control plane 170. For example, time slots can be advertised as 1-800 available for 1 Tbps; 1-600 available for 750 Gbps; 1-400 available for 500 Gbps; 1-200 available for 250 Gbps; 1-10, 21-30, 101-110, 121-130, 201-220, 241-260, 401-440 and 481-500 for 200 Gbps; or any other combination. Additionally, the transceiver 100 can advertise impending changes in the availability of time slots. For example, if the SNR monitor detects a falling SNR, the transceiver 100 can warn that time slots 401 to 800 will not be available soon.

Referring to FIGS. 9-13, in exemplary embodiments, end-to-end bandwidth operations are illustrated in accordance with the flexible bandwidth adaptation systems and methods. In network deployments, network paths containing end points and one or more intermediate nodes (e.g., regenerators), the bandwidth of the path is limited by the lowest bandwidth section. Thus, all nodes in the path have to adjust their throughput to match the lowest throughput section. As long as the current modulation format on an individual section can support the path throughput, the modulation format does not have to change. If an increase in path throughput is desired, all sections can be checked for SNR to determine if a modulation format change will allow additional throughput. Coordinating modulation changes along the path will minimize traffic interruption. When a single section has to drop bandwidth by a modulation change, the path can quickly adapt by signaling this change to all nodes in the path. When one or more sections require a modulation change to increase bandwidth, the path can quickly adapt by signaling this change to all nodes in the path.

In an exemplary embodiment, the flexible bandwidth adaptation systems and methods can include a method of resizing line path bandwidth using a Link Capacity Adjustment (LCAS)-like protocol. Here, Differential Delay Compensation is not required. As described herein, the transceiver 100 payload areas are divided into time slots, and bandwidth affects the number of available time slots. For Bandwidth Adjustment, requests to increase or decrease the number of time slots are passed between interfaces using communications channels, e.g. an out-of-band service channel, in-band service channel (note, this requires automatic TX and RX modulation alignment so that the in-band service channel can be demodulated and decoded). Also, originating, terminating, and intermediate equipment must participate in the method of resizing line path bandwidth. Note, the intermediate equipment may or may not be present.

The method of resizing line path bandwidth can include Bandwidth Control Overhead (BWCOH) exchanged between the originating, terminating, and intermediate equipment. The BWCOH can include commands of increment (INC) (add sub channel(s) time slot(s)), decrement (DEC) (remove sub channel(s) time slot(s)), normal (NRML) (take action from previous increment or decrement command), and available (for sub channel(s) list maximum supported time slots based on the control plane 170). The BWCOH can have a direction flow of forward (FWD) (from originating node to terminating node) and backward (BWD) (from terminating node to originating Node). Additionally, the BWCOH can include status, OK (command can be supported) or failed (command cannot be supported), a sub-channel bit field, a set Bit for each channel addressed in the command, sub-channel time slots, 80/40/20/10/0, and error checks (CRC over BWCOH).

In an exemplary embodiment, the originating nodes can generate FWD increment and FWD decrement commands (along with available and normal commands); generate FWD decrement command when receiving a BWD decrement command; and generate NRML command after generating FWD Increment, decrement and available command and receiving the matching BWD command. The intermediate nodes can generate BWD backward decrement command, pass FWD commands and adjust status and time slots as required, and pass BWD commands noting status and time slots. The terminating nodes can generate backward decrement command, and generate BWD command when receiving FWD command noting status and time slots and adjusting status and time slots as required.

Figure 9:
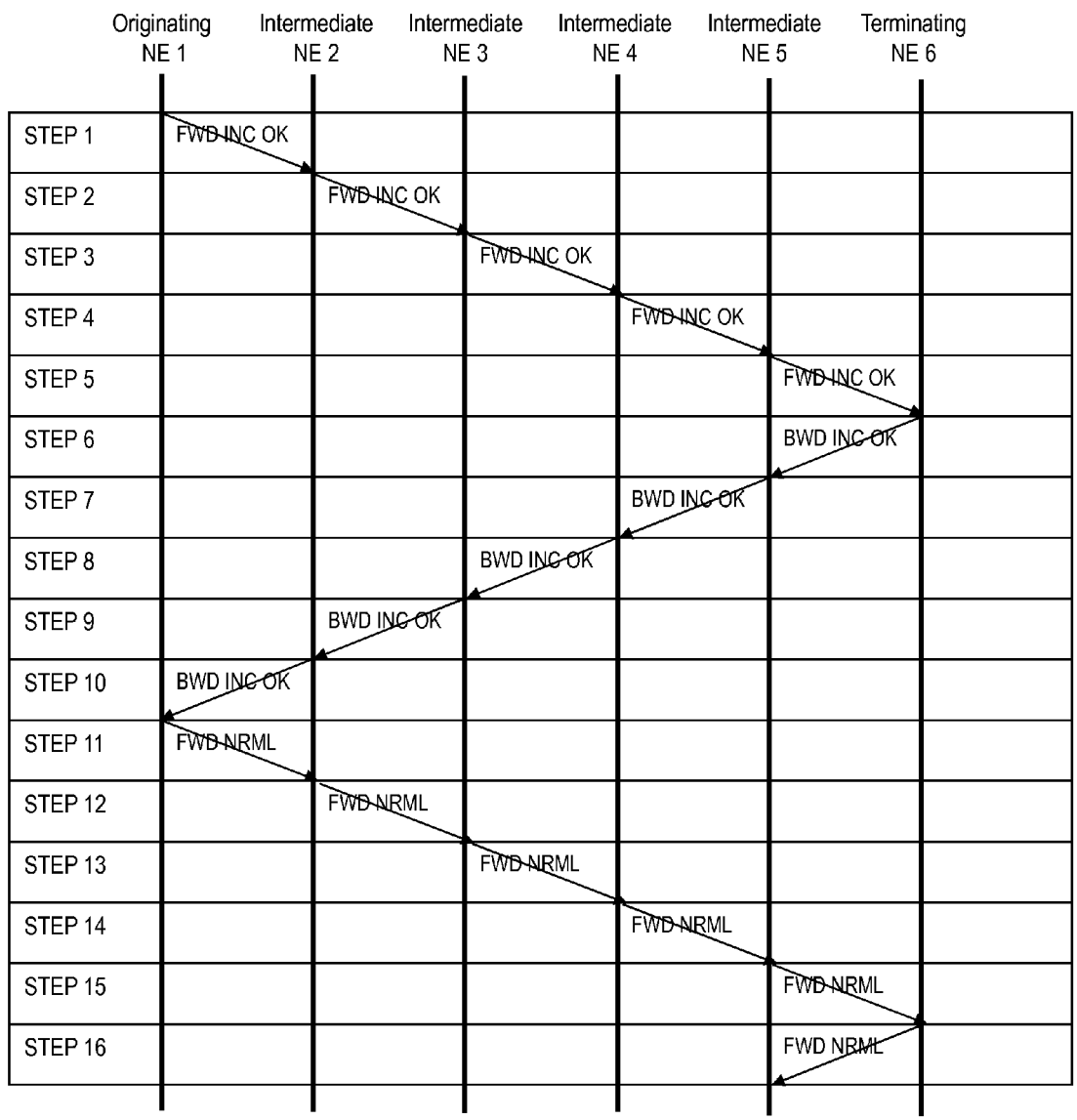
FIGS. 9-13 are diagrams of end-to-end bandwidth operations between originating, intermediate, and terminating network elements in accordance with the flexible bandwidth adaptation systems and methods.

FIGS. 9-13 are end-to-end bandwidth operations using the method of resizing line path bandwidth. Here, there is an originating network element (NE) 1, four intermediate network elements 2-5, and a terminating network element 6. FIG. 9 is an example of the originating NE requesting increment in bandwidth. Only originating NEs can request increment in time slots (adjust modulation for more bandwidth). In Step 1, the originating NE Sends CMD FWD INCR with Status=OK and sub-channel(s) and time slot(s) identified. In Step 2-5, intermediate NE's check SNR and verify that a bandwidth increment is OK and pass the FWD command along. In Step 6, the terminating NE checks SNR and verifies that increment is OK and generate BWD command along with same contents as received FWD command. In Steps 7-10, the intermediate NEs pass the BWD command along noting that status is OK. In Step 11, the originating NE sends a normal command and since the received increment command status was OK, increases time slots on addressed sub-channels. In Steps 12-15, upon receiving the normal command, the intermediate NEs pass through the normal command, since the received increment command status was OK, increases time slots on addressed sub-channels. In Step 16, upon receiving the normal command, the terminating NE generates the normal command, and since the received increment command status was OK, increases time slots on addressed sub channels.

Figure 10:
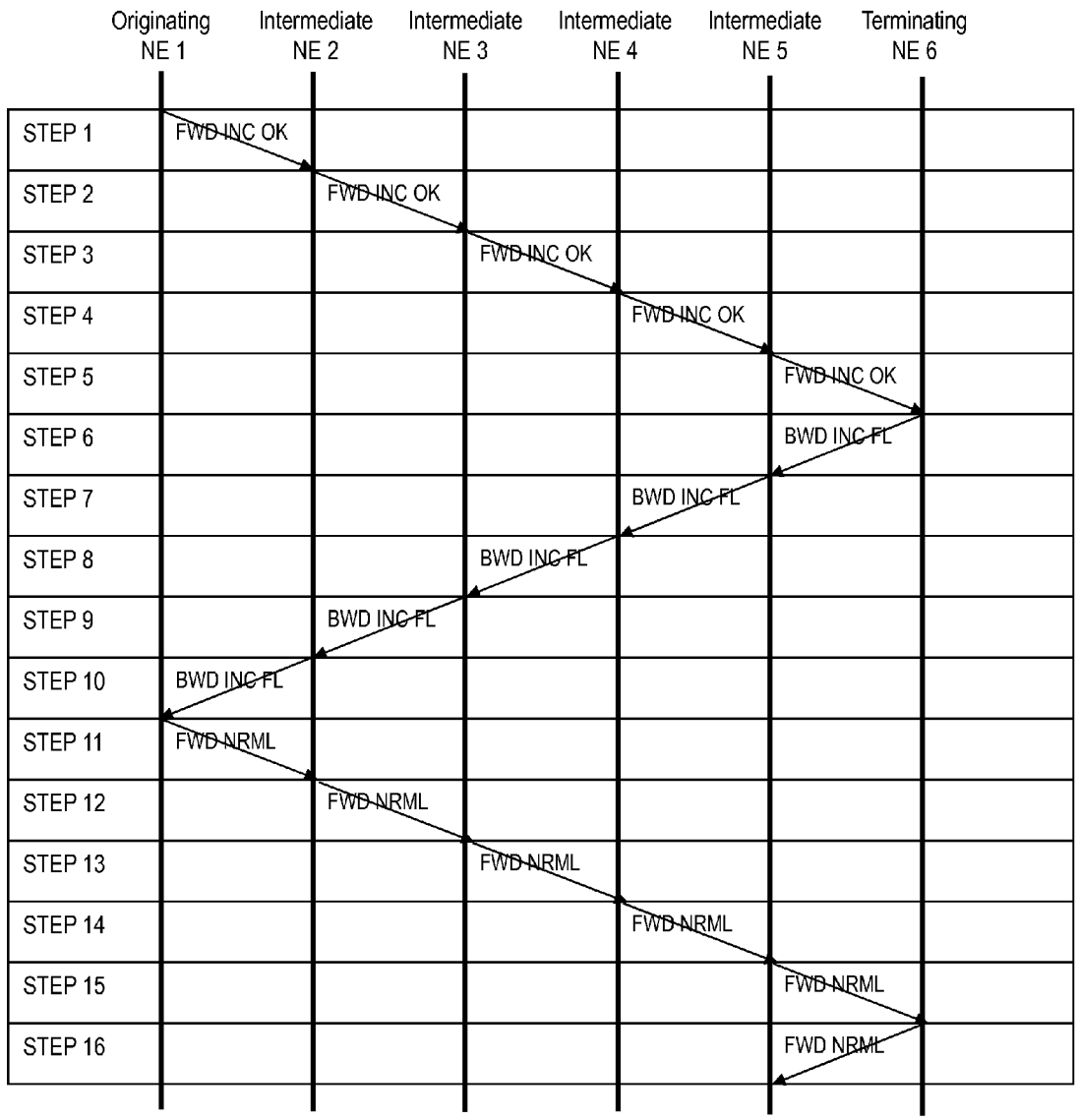

FIG. 10 is an example of the originating NE requesting incremental bandwidth where the request for additional time slots cannot be accommodated at the terminating NE. In Step 1, the originating NE Sends CMD FWD INCR with Status=OK and sub-channel(s) and time slot(s) identified. In Step 2-5, intermediate NE's check SNR and verify that a bandwidth increment is OK and pass the FWD command along. In Step 6, the terminating NE checks SNR and determines it cannot increase bandwidth, and changes the status field to Failed and sends backward command with Stat=Failed. In Steps 7-10, Intermediate NEs pass the BWD command along noting that status is failed. In Step 11, the originating NE sends a normal command and since the received command increment status was Failed, no time slot changes are made. In Steps 12-15, upon receiving the normal command, the intermediate NEs pass through the normal command and since the received increment command status was Failed, no time slot changes are made. In Step 16, upon receiving normal command, the terminating NE generates the normal command and since the received increment command status was Failed, no time slot changes are made.

Figure 11:
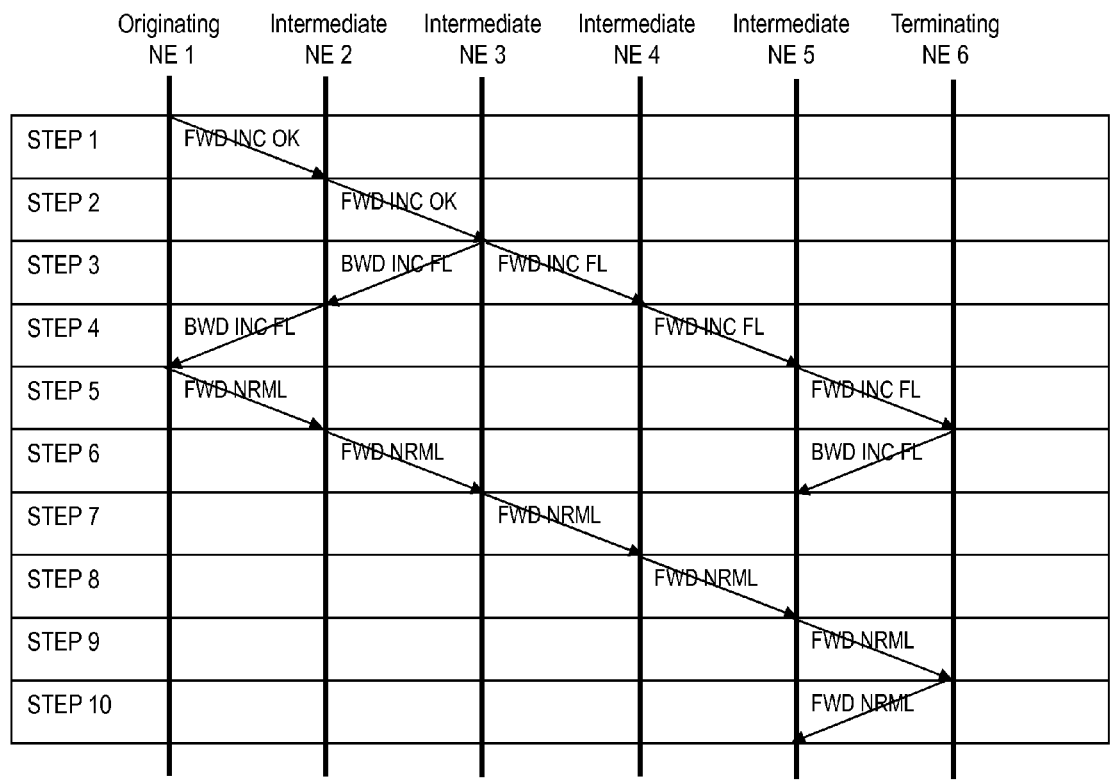

FIG. 11 is an example of the originating NE requesting incremental bandwidth where the request for additional time slots cannot be accommodated at one of the intermediate NEs. In Step 1, the originating NE Sends CMD FWD INCR with Status=OK and sub-channel(s) and time slot(s) identified. In Step 2, the intermediate NE 2 check SNR and verifies that the increment is OK and passes FWD command along. In Step 3, the intermediate NE 3 checks SNR and determines it cannot increase bandwidth, and changes Status field to Failed and sends backward and forward commands with Stat=Failed. In Step 4, the intermediate NE passes BWD command along noting that status is failed. In Steps 4-5, the intermediate NEs pass FWD command along noting that the status is failed. In Step 5, the originating NE sends a normal command and since the received command increment status was Failed, no time slot changes are made. In Steps 6-9, upon receiving the normal command, the intermediate NEs pass through the normal command and since the received increment command status was Failed, no time slot changes are made. In Step 10, upon receiving normal command, terminating NE generates the normal command and since the received increment command status was Failed, no time slot changes are made.

Figure 12:
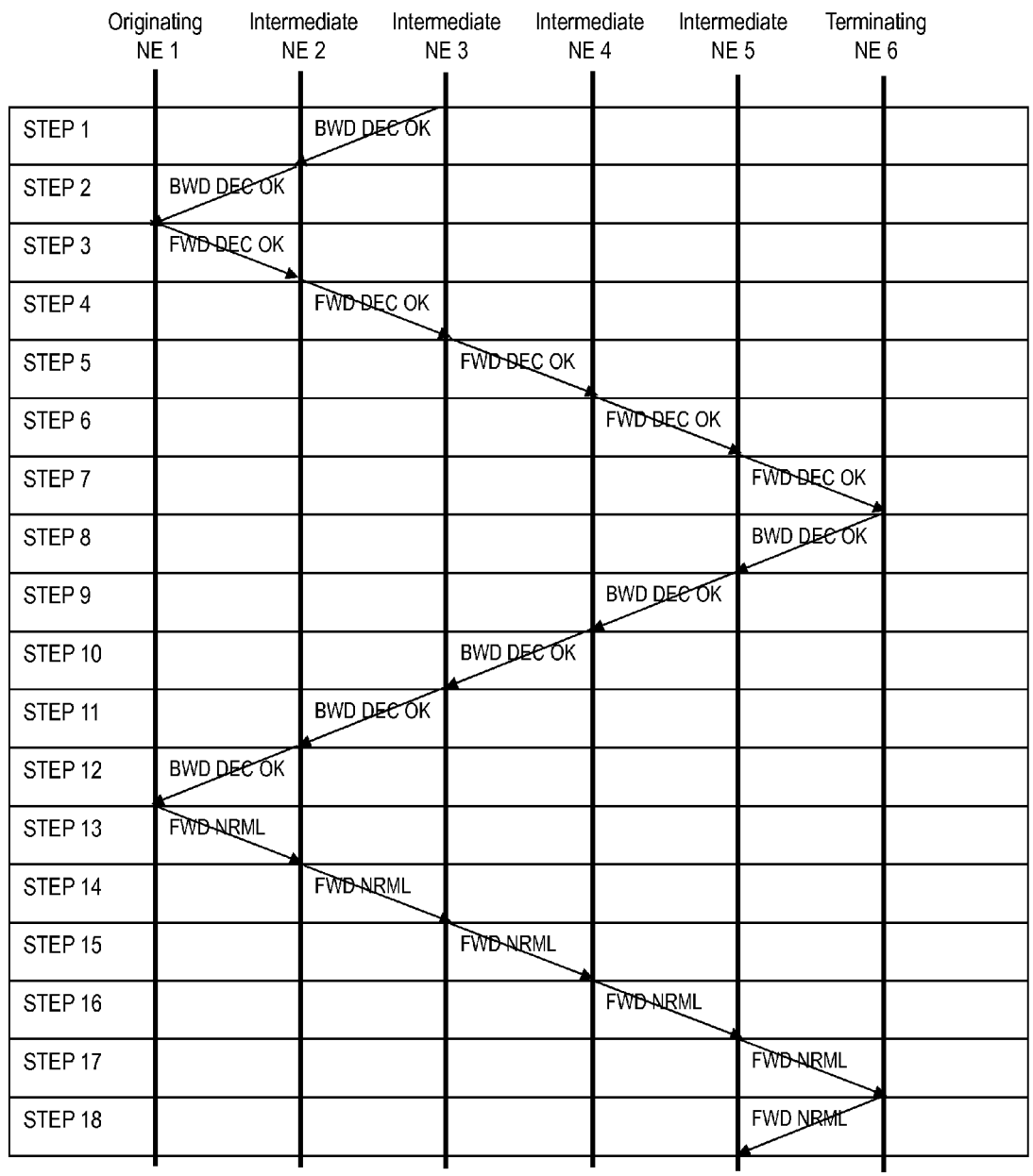

FIG. 12 is an example of any node requesting a decrement in time slots, i.e. adjusting modulation for less bandwidth. In Step 1, the intermediate NE 3 sends a command to decrement bandwidth (BWD DEC) with Stat=OK, Sub Channel(s), Time Slot(s), etc. In Step 2, the intermediate NEs pass BWD command along noting that status is OK. In Step 3, the originating NE notes that the status is OK and generates a FWD command with same information. In Steps 4-7, the intermediate NEs check SNR, verify decrement is OK and pass the FWD command along noting that status is OK. In Step 8, the terminating NE checks SNR, verifies decrement is OK and generates a BWD with the same information command along noting that status is OK. In Step 9-12, the intermediate NEs pass the BWD command along noting that status is OK. In Step 13, the originating NE generates a normal command and since the received DEC command status was OK, decrements times slots and adjusts modulation formats on addressed sub channels. In Steps 14-17, the intermediate NEs pass the normal command and since the received DEC command status was OK, decrement times slots and adjust modulation formats on addressed sub channels. In Step 18, the terminating node generates a normal command and since the received DEC command status was OK, decrements times slots and adjusts modulation formats on addressed sub channels.

Figure 13:
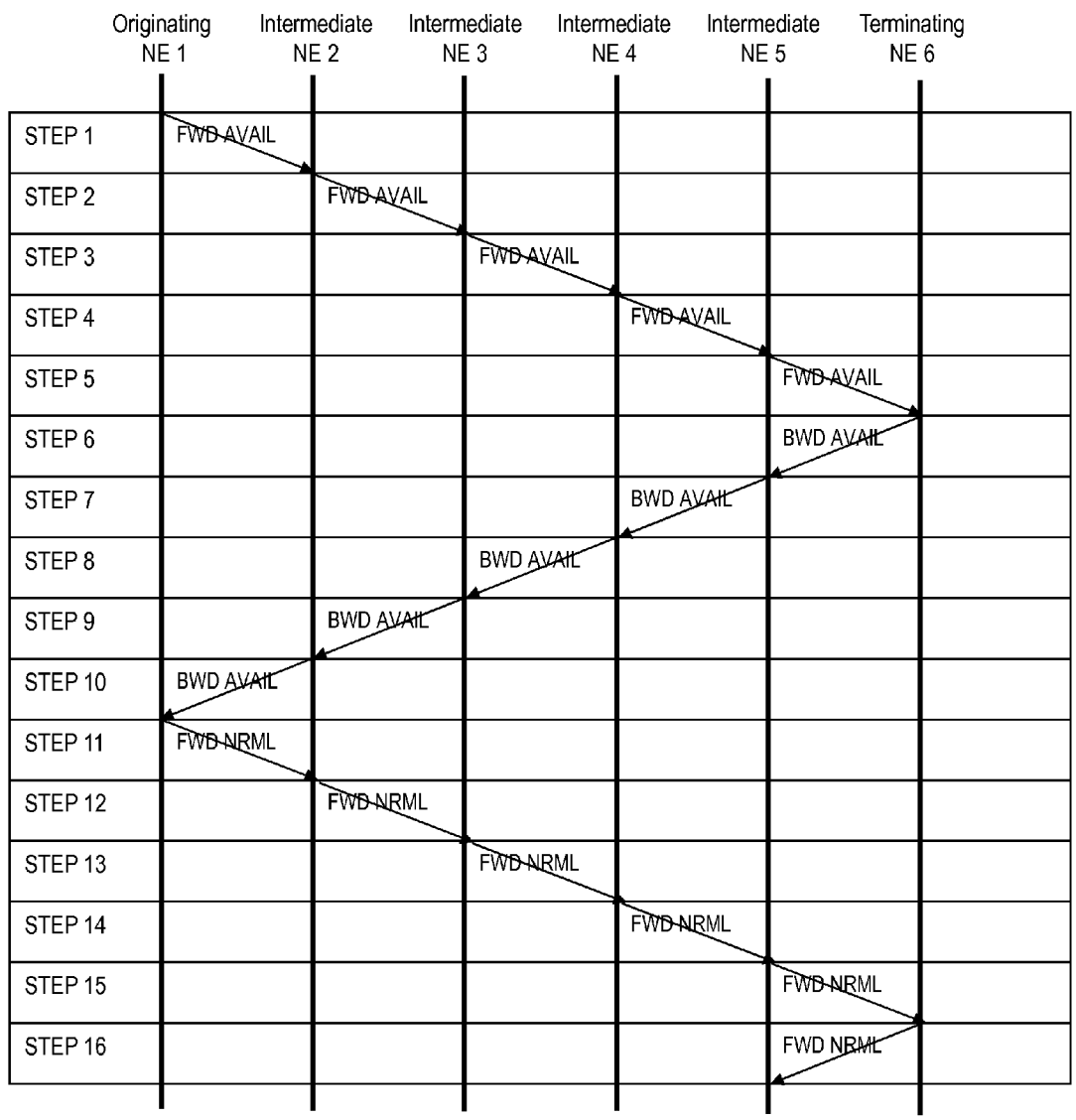

FIG. 13 is an example of the originating NE requesting available time slots. Only the originating NE can request available time slots (i.e., bandwidth available by changing modulation). In Step 1, the originating NE Sends a CMD FWD AVAIL with Stat=OK, Sub Channel(s), Time Slot(s). In Step 2-5, the intermediate NEs check SNR and if available time slots are less than received time slots, send AVAIL command with supported time slots, otherwise passes AVAIL command along with the same information. In Step 6, the terminating NE checks SNR and if available time slots are less than received time slots, generates FWD AVAIL command with supported time slots, otherwise generates FWD AVAIL command along with the same information. In Steps 7-10, the intermediate NEs pass the BWD command along noting available time slots. In Step 11, the originating node sends a normal command. In Steps 12-15, upon receiving the normal command, the intermediate NEs pass through the normal command. In Step 16, upon receiving the normal command, the terminating node generates a normal command.

The foregoing table illustrates stripping of time slots across the sub-channels for the transceiver 100. In particular, each 100 Gbps of bandwidth uses a total of 80 time slots. The 80 time slots may be striped across all of the sub-channels.

| | BW Used | | | | | | | | | |
|---|---|---|---|---|---|---|---|---|---|---|
| | 100 G | 200 G | 300 G | 400 G | 500 G | 600 G | 700 G | 800 G | 900 G | 1 T |
| | | | | | Time slots per channel | | | | | |
| Channel | 8 | 16 | 24 | 32 | 40 | 48 | 56 | 64 | 72 | 80 |
| 1 | 1-8 | 1-16 | 1-24 | 1-32 | 1-40 | 1-48 | 1-56 | 1-64 | 1-72 | 1-80 |
| 2 | 81-88 | 81-96 | 81-104 | 81-112 | 81-120 | 81-128 | 81-136 | 81-144 | 81-152 | 81-160 |
| 3 | 161-168 | 161-176 | 161-184 | 161-192 | 161-200 | 161-208 | 161-216 | 161-224 | 161-232 | 161-240 |
| 4 | 241-248 | 241-256 | 241-264 | 241-272 | 241-280 | 241-288 | 241-296 | 241-304 | 241-312 | 241-320 |
| 5 | 321-328 | 321-336 | 321-344 | 321-352 | 321-360 | 321-368 | 321-376 | 321-384 | 321-392 | 321-400 |
| 6 | 401-408 | 401-416 | 401-424 | 401-432 | 401-440 | 401-448 | 401-456 | 401-464 | 401-472 | 401-480 |
| 7 | 481-488 | 481-496 | 481-504 | 481-512 | 481-520 | 481-528 | 481-536 | 481-544 | 481-552 | 481-560 |
| 8 | 561-568 | 561-576 | 561-584 | 561-592 | 561-600 | 561-608 | 561-616 | 561-624 | 561-632 | 561-640 |
| 9 | 641-648 | 641-656 | 641-664 | 641-672 | 641-680 | 641-688 | 641-696 | 641-704 | 641-712 | 641-720 |
| 10 | 721-728 | 721-736 | 721-744 | 721-752 | 721-760 | 721-768 | 721-776 | 721-784 | 721-792 | 721-800 |

With respect to the switch 130 and/or the interface 132 in the transceiver 100, the transceiver 100 may be used in a TDM device, a Packet device, or a combination thereof. In TDM-based core switches, a provisioned data rate must be maintained, within limits of the method of resizing line path bandwidth. The provisioning can be used to increase/decrease data rate to take advantage of SNR increase/decrease. In packet-based core switches, traffic flows are packetized. Note, any traffic type can be packetized (also known as Segmentation and Reassembly (SAR)). For example, Ethernet traffic can be encapsulated into switch packets, TDM traffic (SONET/SDH/OTN/etc.) can be "chopped up" and encapsulated into switch packets, etc. The packet switch routes switch packets between ports, and packet flows can easily be switched between sub channels on the transceiver 100 to accommodate faults and bandwidth changes. Also, the packet flows can be concatenated across multiple transceiver 100. Accommodating bandwidth changes and faults can be as simple as back pressure from the transceiver 100 to the core switch or can use one of many bandwidth signaling approaches.

In an exemplary embodiment, the flexible bandwidth adaptation systems and methods can reduce power consumption using the adaptive modulation formats in links with varying traffic loads. An aspect of networks is that traffic loads statistically vary over time based on a plurality of factors (e.g., time, day, specific events, etc.). Conventionally, networks requires that transport paths be outfitted with maximum data throughput 100% of the time even though it is required only at peak usage times. The flexible bandwidth adaptation systems and methods described herein are ideal to adapt the modulation format to match the current traffic load. This allows for a partial shutdown of the transceiver 100 hardware for a given traffic load.

Figure 14A:
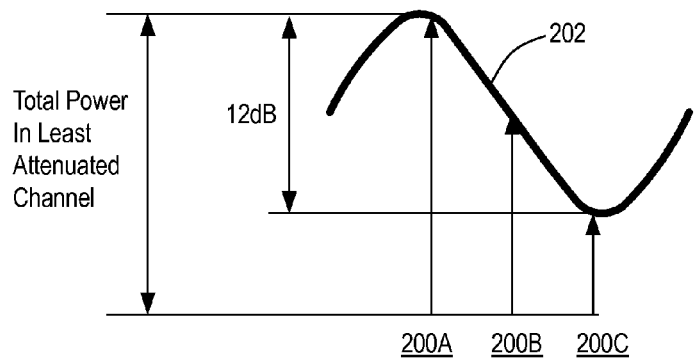
FIGS. 14A-14C are graphs of maximizing data throughput and reducing costs in the presence of power ripple.
Figure 14B:
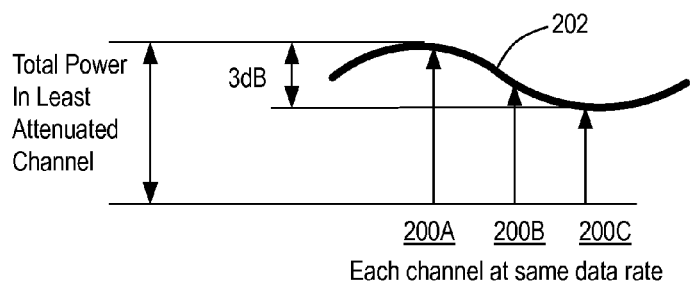
Figure 14C:
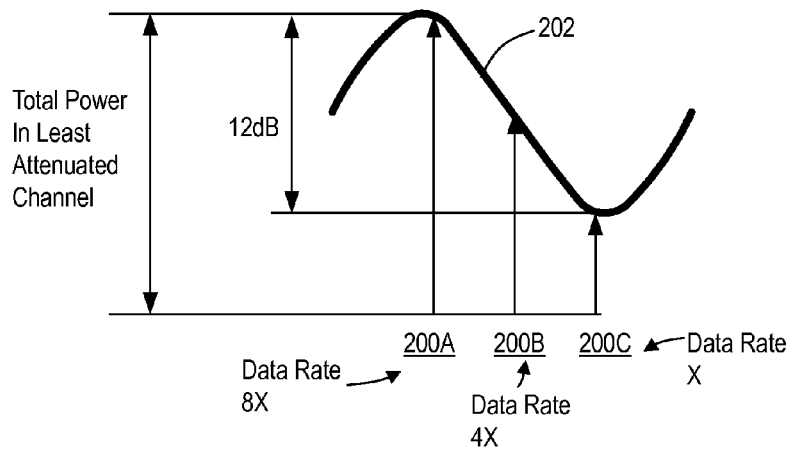

Referring to FIGS. 14A-14C, in an exemplary embodiment, graphs illustrate maximizing data throughput and reducing costs in the presence of span ripple. In particular, the graphs include three signals 200A, 200B, 200C graphed on a frequency versus power graph. As the signals 200A, 200B, 200C travel over fiber plant, optical amplifiers, etc., the signals 200A, 200B, 200C are attenuated differently based on frequency resulting in ripple and tilt. Note, the example of FIGS. 14A-14C illustrates ripple, but the same concepts apply to tilt. FIG. 14A illustrates uncorrected ripple 202 and its affect on the power of the signals 200A, 200B, 200C. Specifically, there is a 12 dB difference between the signal 200A and the signal 200C. Conventional ripple correction (FIG. 14B) includes a device in the span that attenuates all channels to match the worst attenuated channel, i.e. the signal 200C. The extra loss reduces the signal power relative to noise in the span ultimately reducing SNR which limits reach and max data rate for the channel. Additional amplification is required to accommodate the extra loss of the ripple reducer, adding cost. The flexible bandwidth adaptation systems and methods can adapt data rates of each of the signals 200A, 200B, 200C to the associated SNR thereby maximizing rate and reach. For example, high SNR channels can use higher data rate modulations formats, e.g. the signal 200A, and the lower SNR channels can user lower data rate modulation formats, e.g. the signal 200C. This also removes ripple reducing devices in the fiber plant which reduces costs.

Figure 15:
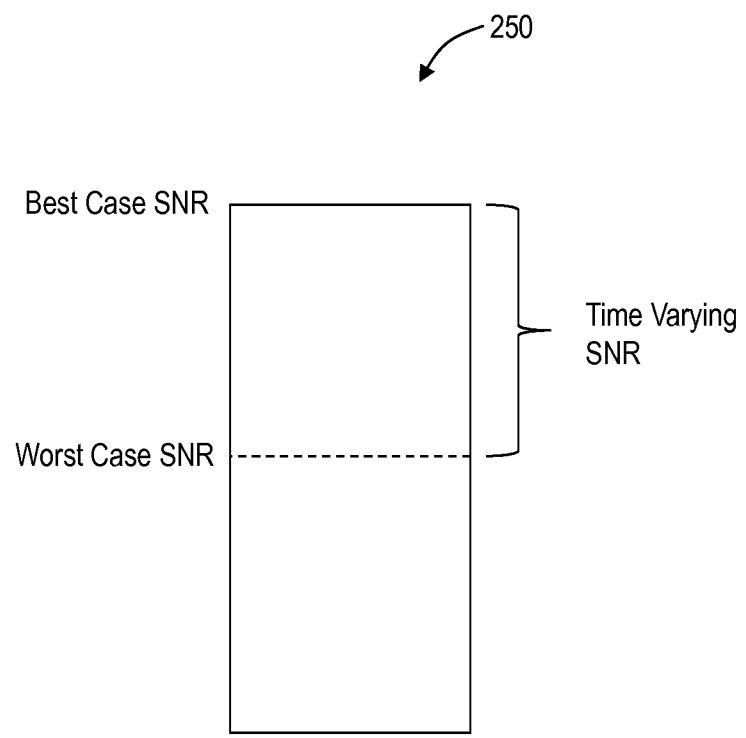
FIG. 15 is a graph of variance in SNR over time for a channel in accordance with the flexible bandwidth adaptation systems and methods.

Referring to FIG. 15, in an exemplary embodiment, a graph illustrates variance in SNR over time for a channel 250. Of note, the channel 250 when deployed will have SNR that varies over time based on various factors, e.g. daily temperature changes, mechanical vibration, etc. Conventional systems with fixed modulation formats require deployment based on a worst case SNR reducing reach, requiring extra equipment (amplifiers and regenerators), etc. The flexible bandwidth adaptation systems and methods can use the adapting modulation formats to maximize data rates as SNR varies allowing an effective throughput based on an average SNR (in lieu of a worst case SNR). Thus, the flexible bandwidth adaptation systems and methods advantageously increase data throughput for a given fiber plant, and maximize reach without having to add amplifiers and regenerators.

Using the average SNR to drive data throughput allows greater oversubscription than worst case SNR. This may have application with data services, such as Carrier Ethernet, for example. Carrier Ethernet may include Guaranteed throughput and Best Effort throughput. For Guaranteed throughput, a specific data throughput is guaranteed and is the last traffic to be dropped in the event of congestion. Bursts of traffic above that guaranteed rate may be dropped in case of congestion. This is usually a Business class of service. For Best Effort throughput, this is effectively "No Effort" and is the first data to be dropped in the event of congestion. This takes advantage of unused bandwidth when higher priority traffic is not using its full bandwidth. This is usually a residential class of service. With conventional systems, the worst case SNR is used to determine bandwidth. For example, some portion of the bandwidth is dedicated to guaranteed services (e.g., 80%), and the remaining is divided among Burst traffic and Best effort traffic (e.g., 30%) for a total subscription of 110%. The flexible bandwidth adaptation systems and methods adapt to varying SNR to maximize BW bandwidth. For example, if SNR increases during the day, allotment could be 80% average for Guaranteed and 30% average for best effort.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A fiber optic system, comprising:
    a transmitter configured to utilize any one of a plurality of modulation formats; and
    a receiver communicatively coupled to the transmitter and configured to utilize any one of the plurality of modulation formats;
    wherein the transmitter and the receiver are cooperatively configured to set a modulation format from the plurality of modulation formats based upon an average signal-to-noise ratio at the receiver instead of a worst case signal-to-noise ratio at the receiver; and
    wherein the transmitter and the receiver utilize an in-band communication channel for signaling modulation format changes and utilize a blind system recovery mechanism to re-establish the in-band communication channel subsequent to a disruption that causes the in-band communication channel to fail based on any of a Loss of Frame (LOF), a Loss of Multi-frame (LOM), and a degradation in Signal-to-Noise Ratio (SNR), and wherein the blind system recovery mechanism operates to establish the in-band communication channel and the blind system recovery mechanism uses a predetermined modulation format change cycle occurring at each of the transmitter and the receiver instead of end-to-end modulation mode signaling changes between the transmitter and the receiver.

2. The fiber optic system of claim 1, wherein the receiver is configured to determine signal-to-noise ratio through any of a bit error rate, a corrected forward error correction count, a symbol error rate, and a constellation estimate.

3. The fiber optic system of claim 1, further comprising:
    transmitter data circuitry coupled to the transmitter; and
    receiver data circuitry coupled to the receiver;

wherein one or more of the transmitter data circuitry and the receiver data circuitry is configured to buffer data such that any changes between the plurality of modulation formats are performed in a hitless manner.

4. The fiber optic system of claim 1, wherein:
a plurality of Optical Transport Network (OTN) timeslots are utilized at the fiber optic system, and wherein a number of the plurality of timeslots is based at least on client data demands.

5. The fiber optic system of claim 1, wherein, on start-up or recovery and without in-band communication, each of the transmitter and the receiver are configured to cycle through a predetermined sequence of the plurality of modulation formats.

6. The fiber optic system of claim 1, wherein the plurality of modulation formats comprise Binary Phase Shift Keying, Quadrature Phase Shift Keying, 8-Quadrature Amplitude Modulation, and 16-Quadrature Amplitude Modulation.

7. The fiber optic system of claim 1, wherein each of the transmitter and the receiver are configured with a plurality of sub-channels.

8. The fiber optic system of claim 7, wherein the transmitter and the receiver are cooperatively configured to reduce bandwidth by excluding failed subsystems associated with any of the plurality of sub-channels.

9. The fiber optic system of claim 1, further comprising:
at least one intermediate optical transceiver between the transmitter and the receiver; and
a mechanism for signaling modulation format changes between the transmitter, the at least one intermediate optical transceiver, and the receiver.

10. The fiber optic system of claim 9, wherein the mechanism for signaling is configured for any of the transmitter, the at least one intermediate optical transceiver, and the receiver to initiate a decrease in bandwidth due to degradation of the signal-to-noise ratio, and for the transmitter to initiate an increase in bandwidth due to degradation of the signal-to-noise ratio.

11. The fiber optic system of claim 1, wherein the blind system recovery mechanism is performed without the in-band communication channel and comprises one of:
operating each of a plurality of sub-channels at a different modulation format to establish an in-band communication link on at least one of the plurality of sub-channels; and
operating each of the plurality of sub-channels at a fixed modulation format that is changed over a time period for each transmitter while each receiver cycles through all modulation formats over the time period to establish the in-band communication link.

12. An optical transceiver, comprising:
a transmitter configured to utilize any of a plurality of modulation formats, wherein the transmitter is communicatively coupled to a far end receiver; and
a receiver communicatively configured to utilize any of the plurality of modulation formats, wherein the receiver is communicatively coupled to a far end transmitter;
wherein the transmitter and the far end receiver are cooperatively configured to set a modulation format from the plurality of modulation formats based upon an average signal-to-noise ratio associated therewith instead of a worst case signal-to-noise ratio associated therewith;
wherein the receiver and the far end transmitter are cooperatively configured to set a modulation format from the plurality of modulation formats based upon an average signal-to-noise ratio associated therewith instead of a worst case signal-to-noise ratio associated therewith; and
wherein the transmitter and the receiver utilize an in-band communication channel for signaling modulation format changes and utilize a blind system recovery mechanism to re-establish the in-band communication channel subsequent to a disruption that causes the in-band communication channel to fail based on any of a Loss of Frame (LOF), a Loss of Multi-frame (LOM), and a degradation in Signal-to-Noise Ratio (SNR), and wherein the blind system recovery mechanism operates to establish the in-band communication channel and the blind system recovery mechanism uses a predetermined modulation format change cycle occurring at each of the transmitter and the receiver instead of end-to-end modulation mode signaling changes between the transmitter and the receiver.

13. The optical transceiver of claim 12, further comprising:
a first plurality of sub-channels transmitted by the transmitter; and
a second plurality of sub-channels received by the receiver;
wherein each of the first plurality of sub-channels and the second plurality of sub-channels utilizes one of the plurality of modulation formats.

14. The optical transceiver of claim 12, wherein the receiver is configured to determine signal-to-noise ratio through any of a bit error rate, a corrected forward error correction count, and a constellation estimate, and wherein the receiver is configured to communicate the determined signal-to-noise ratio to the far end transmitter.

15. The optical transceiver of claim 12, wherein the transmitter comprises configurable modulators configured to provide any of Binary Phase Shift Keying, Quadrature Phase Shift Keying, 8-Quadrature Amplitude Modulation, and 16-Quadrature Amplitude Modulation.

16. A flexible bandwidth adaptation method, comprising:
monitoring at least one aspect of an optical link at a network element;
responsive to the at least one aspect, selecting an improved modulation scheme from a plurality of modulation schemes for the optical link; and
when the improved modulation scheme is selected, changing to the improved modulation scheme;
wherein an effective throughput associated with the optical link is set based on an average signal-to-noise ratio instead of a worst case signal-to-noise ratio; and
wherein the optical link utilizes an in-band communication channel for signaling modulation format changes and utilizes a blind system recovery mechanism to re-establish the in-band communication channel subsequent to a disruption that causes the in-band communication channel to fail based on any of a Loss of Frame (LOF), a Loss of Multi-frame (LOM), and a degradation in Signal-to-Noise Ratio (SNR), and wherein the blind system recovery mechanism operates to establish the in-band communication channel and the blind system recovery mechanism uses a predetermined modulation format change cycle occurring at each of a transmitter and a receiver instead of end-to-end modulation mode signaling changes between the transmitter and the receiver.

17. The flexible bandwidth adaptation method of claim 16, wherein the monitoring comprises:
at an originating network element of the optical link, monitoring for transceiver health and client bandwidth demand; and at a terminating network element of the optical link, monitoring for signal-to-noise ratio.

18. The flexible bandwidth adaptation method of claim 17, further comprising:
the originating network element communicating to the terminating network element a degradation in the signal-to-noise ratio and a request to adapt to a different modulation scheme based thereon.

19. The flexible bandwidth adaptation method of claim 17, further comprising:
at an intermediate network element of the optical link, monitoring for signal-to-noise ratio; and
communicating to the terminating network element a degradation in the signal-to-noise and a request to adapt to a different modulation scheme based thereon.

20. The flexible bandwidth adaptation method of claim 16, further comprising:
prior to changing to the new modulation scheme, buffering data such that the change to the improved modulation scheme is hitless.

* * * * *